US012621712B2

(12) United States Patent
Tan et al.

(10) Patent No.: US 12,621,712 B2
(45) Date of Patent: May 5, 2026

(54) DATA SENDING METHOD, DATA RECEIVING METHOD, AND COMMUNICATION APPARATUS

(71) Applicant: HUAWEI TECHNOLOGIES CO., LTD., Guangdong (CN)

(72) Inventors: Zhiyuan Tan, Shanghai (CN); Pengpeng Dong, Shanghai (CN); Huiying Zhu, Shanghai (CN); Jing Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 18/517,532

(22) Filed: Nov. 22, 2023

(65) Prior Publication Data

US 2024/0098564 A1     Mar. 21, 2024

Related U.S. Application Data

(63) Continuation of application No. PCT/CN2022/094860, filed on May 25, 2022.

(30) Foreign Application Priority Data

May 26, 2021     (CN) .......................... 202110576174.2

(51) Int. Cl.
*H04W 28/06*     (2009.01)
*H04L 1/00*      (2006.01)

(52) U.S. Cl.
CPC ......... *H04W 28/065* (2013.01); *H04L 1/0061* (2013.01)

(58) Field of Classification Search
CPC .. H04W 28/065; H04W 28/04; H04L 1/0061; H04L 67/025; H04L 67/04; H04L 1/0041; H04L 1/0076; H04L 69/22
See application file for complete search history.

(56) References Cited

U.S. PATENT DOCUMENTS 7,706,410 B2 *   4/2010  Chun ..................... H04W 28/06
                                                        370/329
7,949,362 B2 *   5/2011  Turetzky ................. G01S 19/14
                                                        455/150.1

(Continued)

FOREIGN PATENT DOCUMENTS

CA       3114558 A1 *   4/2020  ............ H04W 72/23
CA       3155060 C  *   3/2023  ........ H04W 74/0833

(Continued)

OTHER PUBLICATIONS

NPL Science Direct, Power Headroom, Book 5G NR, Sassan Ahmadi, Chapter New Radio Access Layer 2/3 Aspects and System Operation, 2019 (Year: 2019).*

(Continued)

*Primary Examiner* — Michael A Keller
(74) *Attorney, Agent, or Firm* — WOMBLE BOND DICKINSON (US) LLP

(57)     ABSTRACT

A method is provided that a transmitting end generates a data segment, where the data segment includes header information and data parts of a plurality of CBs that are obtained by dividing a TB, there is a position mapping relationship between the data parts of the plurality of CBs and N sub-PDUs included in a MAC PDU, and the header information of each CB indicates a position mapping relationship between the CB and a sub-PDU corresponding to the CB. The transmitting end sends the TB that carries the data segment. Therefore, at a receiving end, if a CRC error occurs on the TB, the receiving end obtains a position of each CB and performs a CRC decision by using a CB as a granularity, to obtain a correct CB. Thereby performance of a wireless communication system is improved.

21 Claims, 12 Drawing Sheets

(56) References Cited

U.S. PATENT DOCUMENTS

| 8,208,474 | B2 * | 6/2012 | Kim | H04L 1/165 |
| | | | | 370/394 |
| 8,614,948 | B2 * | 12/2013 | Yang | H04L 1/1867 |
| | | | | 370/468 |
| 8,739,014 | B2 * | 5/2014 | Kim | H04L 1/0083 |
| | | | | 714/801 |
| 8,804,761 | B2 * | 8/2014 | Grilli | H04L 1/0041 |
| | | | | 370/469 |
| 10,554,345 | B2 * | 2/2020 | Nammi | H04W 72/23 |
| 10,567,142 | B2 * | 2/2020 | Kim | H04L 1/1829 |
| 10,917,938 | B2 * | 2/2021 | Kwon | H04W 76/27 |
| 10,925,047 | B2 * | 2/2021 | Islam | H04L 1/00 |
| 10,925,082 | B2 * | 2/2021 | Ye | H04L 5/1469 |
| 11,356,141 | B2 * | 6/2022 | Rico Alvarino | H04B 1/713 |
| 11,375,527 | B1 * | 6/2022 | Eyuboglu | H04B 7/15528 |
| 11,616,528 | B2 * | 3/2023 | Rico Alvarino | H04W 72/21 |
| | | | | 370/329 |
| 11,838,151 | B1 * | 12/2023 | Jones | H04L 25/0224 |
| 11,889,447 | B2 * | 1/2024 | Leung | H04W 56/0045 |
| 11,915,552 | B2 * | 2/2024 | Lyons | G07F 17/323 |
| 11,950,326 | B2 * | 4/2024 | Selvanesan | H04L 1/1607 |
| 12,004,243 | B2 * | 6/2024 | Pan | H04W 76/25 |
| 12,225,468 | B2 * | 2/2025 | Ma | H04W 52/0238 |
| 12,284,034 | B2 * | 4/2025 | Li | H04L 1/0045 |
| 12,342,304 | B2 * | 6/2025 | Leung | H04L 47/283 |
| 12,476,751 | B2 * | 11/2025 | Bae | H04L 1/1812 |
| 2007/0291788 | A1 | 12/2007 | Sammour | H04W 28/06 |
| | | | | 370/466 |
| 2010/0103923 | A1 | 4/2010 | Nosley et al. | |
| 2010/0303016 | A1 * | 12/2010 | Jin | H04L 27/0008 |
| | | | | 370/328 |
| 2014/0003378 | A1 * | 1/2014 | Sipola | H04W 28/065 |
| | | | | 370/329 |
| 2015/0139129 | A1 * | 5/2015 | Pani | H04L 1/0007 |
| | | | | 370/329 |
| 2017/0127382 | A1 * | 5/2017 | Zhang | H04W 72/30 |
| 2018/0287752 | A1 * | 10/2018 | Park | H04L 5/0044 |
| 2018/0324779 | A1 * | 11/2018 | Li | H04L 5/0094 |
| 2019/0190654 | A1 * | 6/2019 | You | H04L 1/0063 |
| 2019/0246378 | A1 * | 8/2019 | Islam | H04L 1/1819 |
| 2019/0254022 | A1 * | 8/2019 | Yeo | H04L 1/1607 |
| 2019/0357078 | A1 * | 11/2019 | Akkarakaran | H04L 1/1829 |
| 2020/0084828 | A1 * | 3/2020 | Loehr | H04L 1/1822 |
| 2020/0100225 | A1 * | 3/2020 | Khoshnevisan | H04L 1/1854 |
| 2020/0186290 | A1 * | 6/2020 | Zhang | H04L 1/0073 |
| 2020/0314939 | A1 * | 10/2020 | Park | H04W 72/12 |
| 2020/0351023 | A1 * | 11/2020 | Rico Alvarino | H04W 52/0209 |
| 2020/0396739 | A1 * | 12/2020 | Sundararajan | H04L 1/1614 |
| 2021/0007064 | A1 * | 1/2021 | Yeo | H04L 5/0092 |
| 2021/0050956 | A1 * | 2/2021 | Yeo | H04L 1/1812 |
| 2021/0068082 | A1 * | 3/2021 | Kodali | H04L 45/74 |
| 2021/0153231 | A1 * | 5/2021 | Yeo | H04W 72/0446 |
| 2021/0195543 | A1 * | 6/2021 | Lee | H04W 56/0045 |
| 2021/0368501 | A1 * | 11/2021 | Hamidi-Sepehr | |
| | | | | H04W 72/0446 |
| 2022/0360652 | A1 * | 11/2022 | Low | H04L 1/0061 |
| 2024/0147515 | A1 * | 5/2024 | Uchino | H04L 1/007 |
| 2025/0227713 | A1 * | 7/2025 | Noh | H04W 72/0453 |
| 2025/0351141 | A1 * | 11/2025 | Farag | H04W 72/1268 |

FOREIGN PATENT DOCUMENTS

| CN | 108124285 | A | * | 6/2018 | H04L 49/253 |
| CN | 111092686 | A | * | 5/2020 | H04B 10/27 |
| CN | 111245556 | A | * | 6/2020 | H04W 28/065 |
| CN | 113228732 | A | * | 8/2021 | H04L 5/0044 |
| CN | 113766642 | A | * | 12/2021 | H04W 72/23 |
| CN | 114157517 | A | * | 3/2022 | H04L 69/06 |
| CN | 114885366 | A | * | 8/2022 | H04W 72/21 |
| CN | 115225200 | A | * | 10/2022 | H04L 1/0009 |
| CN | 115552820 | A | * | 12/2022 | H04W 40/22 |
| CN | 115769668 | A | * | 3/2023 | H04L 69/324 |
| CN | 115997438 | A | * | 4/2023 | H04L 1/0061 |
| CN | 120358603 | A | * | 7/2025 | H04W 72/23 |
| CN | 120433884 | A | * | 8/2025 | H04W 72/12 |
| DE | 112020001846 | T5 | * | 12/2021 | H04W 72/23 |
| EP | 2094038 | A1 | * | 8/2009 | H04W 8/26 |
| EP | 2237633 | A1 | * | 10/2010 | H04W 72/21 |
| EP | 1198107 | B1 | * | 11/2012 | H04L 1/1877 |
| EP | 3691194 | A1 | * | 8/2020 | H04L 12/2863 |
| EP | 4145918 | A1 | * | 3/2023 | H04W 74/0833 |
| EP | 3895351 | B1 | * | 8/2023 | H04L 1/0039 |
| JP | 3720347 | B2 | * | 11/2005 | H04N 5/50 |
| JP | 2019087965 | A | | 6/2019 | |
| KR | 20220140529 | A | * | 10/2022 | H04L 5/0044 |
| KR | 20240116992 | A | * | 7/2024 | H04W 72/1263 |
| WO | WO-2004093440 | A1 | * | 10/2004 | H04N 21/41265 |
| WO | WO-2014166102 | A1 | * | 10/2014 | H04L 65/613 |
| WO | WO-2014190546 | A1 | * | 12/2014 | H03M 13/6306 |
| WO | WO-2015107850 | A1 | * | 7/2015 | H04W 72/23 |
| WO | WO-2017044066 | A1 | * | 3/2017 | H04L 1/1671 |
| WO | WO-2017083489 | A1 | * | 5/2017 | H04B 7/0408 |
| WO | WO-2018082661 | A1 | * | 5/2018 | H04W 72/23 |
| WO | WO-2018174569 | A1 | * | 9/2018 | H03M 13/6393 |
| WO | WO-2018175521 | A1 | * | 9/2018 | H04L 5/1469 |
| WO | WO-2019149248 | A1 | * | 8/2019 | H04W 72/53 |
| WO | WO-2020138777 | A1 | * | 7/2020 | H04L 69/324 |
| WO | WO-2020170008 | A1 | * | 8/2020 | H04L 69/22 |
| WO | WO-2020252134 | A1 | * | 12/2020 | H04W 28/065 |
| WO | WO-2021035231 | A2 | * | 2/2021 | H04W 72/21 |
| WO | WO-2021062804 | A1 | * | 4/2021 | H04W 72/56 |
| WO | WO-2022037090 | A1 | * | 2/2022 | H04L 12/02 |
| WO | WO-2022234969 | A1 | * | 11/2022 | H04W 56/0005 |
| WO | WO-2022239891 | A1 | * | 11/2022 | H04W 80/02 |
| WO | WO-2022247847 | A1 | * | 12/2022 | H04W 28/04 |

OTHER PUBLICATIONS

NPL ETSI TS 138 523-1 version 15.1.0 (Oct. 2018), 5G; 5GS; UE conformance specification; Part 1: Protocol (3GPP TS 38.523-1 version 15.1.0 Release 15), 2018 (Year: 2018).*

NPL ETSI TS 138 212 V16.5.0 (Apr. 2021) 5G; NR; Multiplexing and channel coding (3GPP TS 38.212 version 16.5.0 Release 16) 2021 (Year: 2021).*

NPL An overview of channel coding for 5G Nr cellular communications Jung Hyun Bae, 2019 (Year: 2019).*

NPL Adaptive Modulation and Coding based on Reinforcement Learning for 5G Networks Mateus P. Mota, 2019 (Year: 2019).*

NPL ETSI TS 138 321 V16.1.0 (Jul. 2020) 5G; NR; Medium Access Control (MAC) protocol specification (3GPP TS 38.321 version 16.1.0 Release 16), 2020 (Year: 2020).*

NPL ETSI TS 123 501 V16.6.0 (Oct. 2020) 5G; System architecture for the 5G System (5GS) (3GPP TS 23.501 version 16.6.0 Release 16), 2020 (Year: 2020).*

NPL 3GPP TS 36.212 V9.1.0 (Mar. 2010) Technical Specification, 3rd Generation Partnership Project; Technical Specification Group Radio Access Network; Evolved Universal Terrestrial Radio Access (E-UTRA); Multiplexing and channel coding (Release 9), 2010 (Year: 2010).*

* cited by examiner

Macro base station
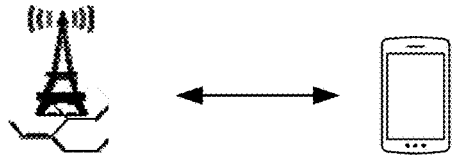
(a) Point-to-point connection
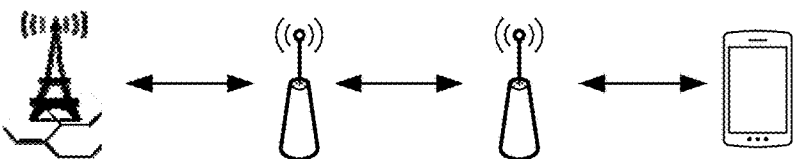
(b) Multi-hop single connection
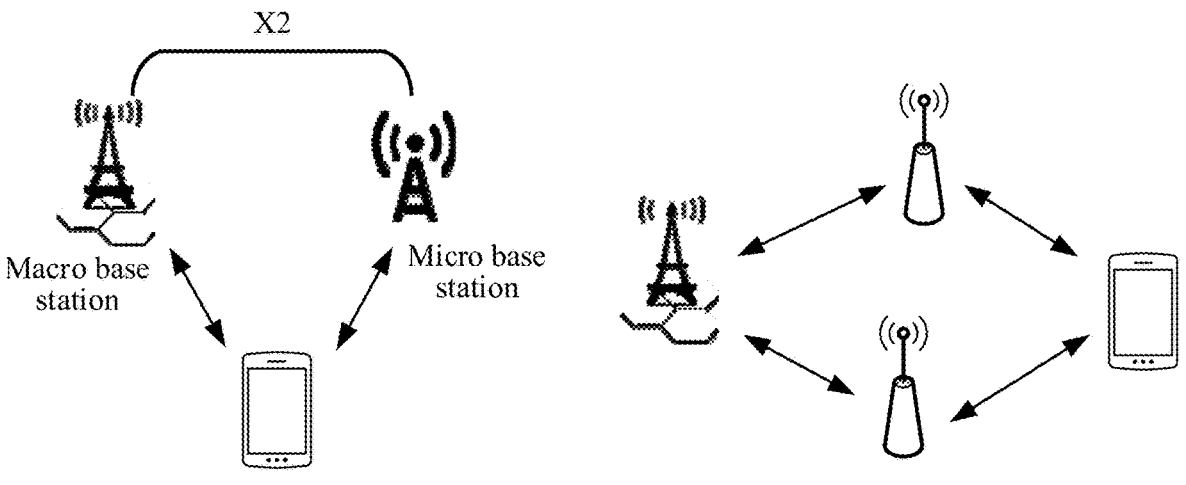
(c) DC dual connection        (d) Multi-hop multi-connection
FIG. 1

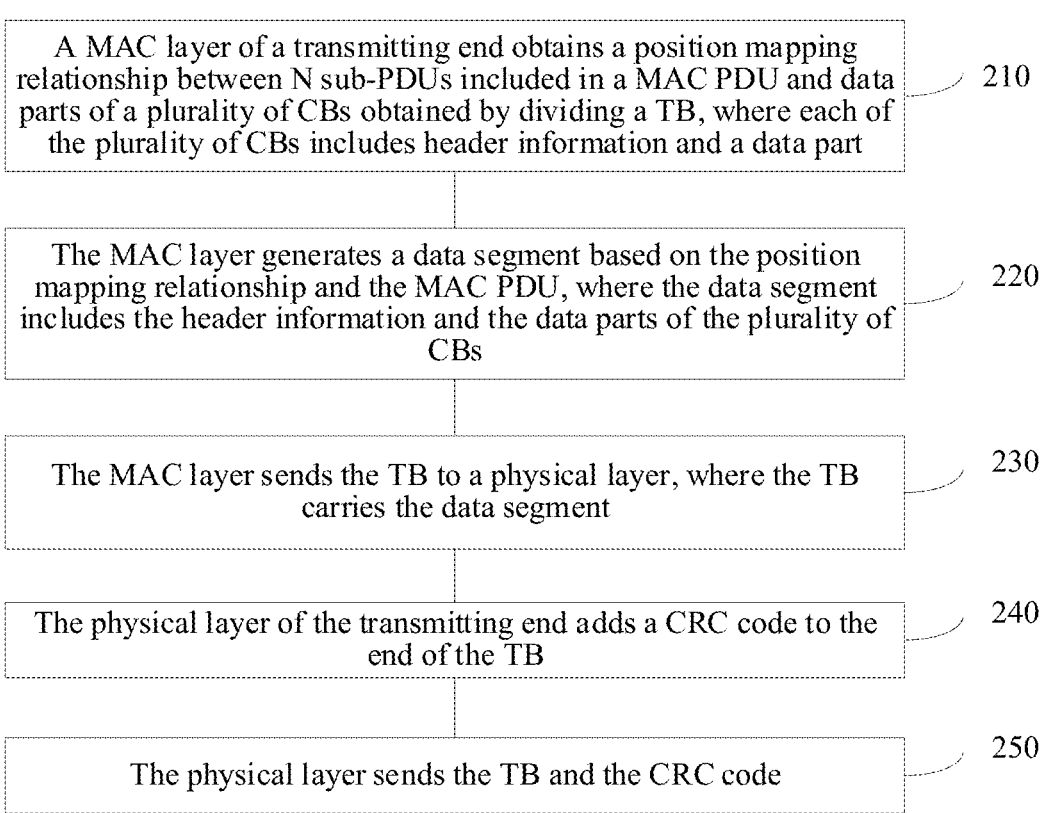

<u>200</u>

A MAC layer of a transmitting end obtains a position mapping relationship between N sub-PDUs included in a MAC PDU and data parts of a plurality of CBs obtained by dividing a TB, where each of the plurality of CBs includes header information and a data part          210

The MAC layer generates a data segment based on the position mapping relationship and the MAC PDU, where the data segment includes the header information and the data parts of the plurality of CBs          220

The MAC layer sends the TB to a physical layer, where the TB carries the data segment          230

The physical layer of the transmitting end adds a CRC code to the end of the TB          240

The physical layer sends the TB and the CRC code          250

FIG. 2

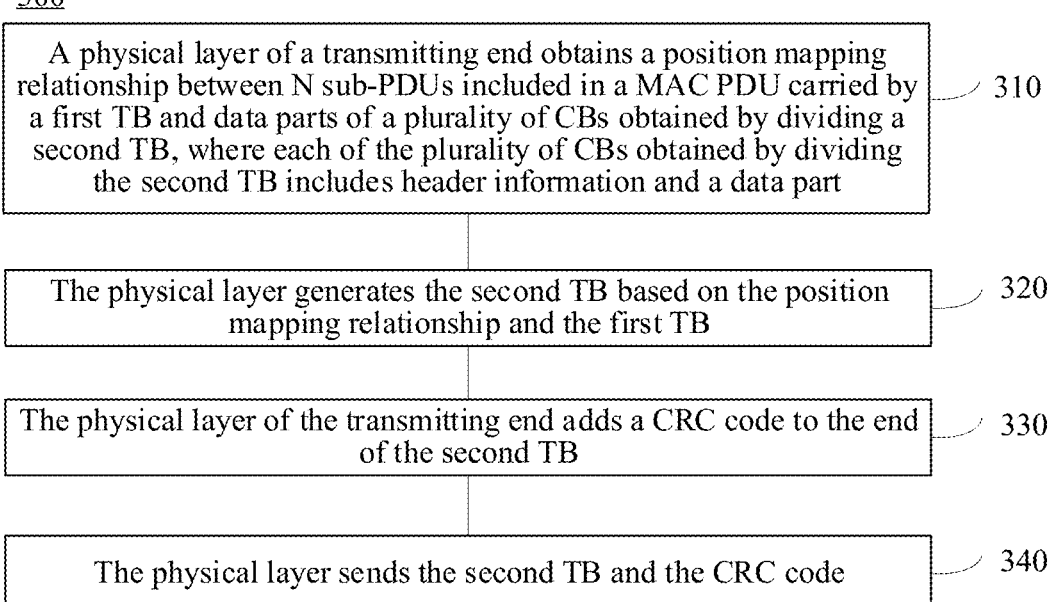

300

A physical layer of a transmitting end obtains a position mapping relationship between N sub-PDUs included in a MAC PDU carried by a first TB and data parts of a plurality of CBs obtained by dividing a second TB, where each of the plurality of CBs obtained by dividing the second TB includes header information and a data part — 310

The physical layer generates the second TB based on the position mapping relationship and the first TB — 320

The physical layer of the transmitting end adds a CRC code to the end of the second TB — 330

The physical layer sends the second TB and the CRC code — 340

FIG. 4

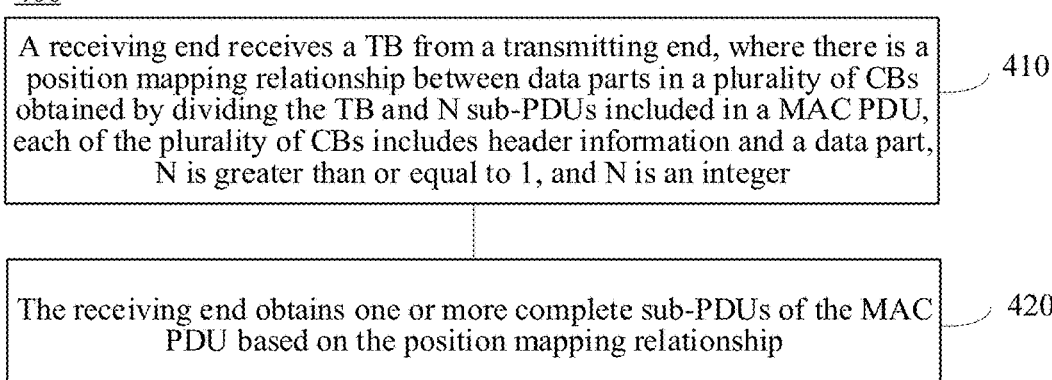

400

| |
|---|
| A receiving end receives a TB from a transmitting end, where there is a position mapping relationship between data parts in a plurality of CBs obtained by dividing the TB and N sub-PDUs included in a MAC PDU, each of the plurality of CBs includes header information and a data part, N is greater than or equal to 1, and N is an integer |

410

| |
|---|
| The receiving end obtains one or more complete sub-PDUs of the MAC PDU based on the position mapping relationship |

Start

501: A PHY layer of a receiving end receives a TB

502: Determine whether CRC on the TB succeeds

Yes

No

505: A MAC CE or a MAC SDU in the TB cannot be identified

504: Determine whether CRC on a CB corresponding to a MAC header succeeds

No

Yes

506: Parse the MAC header to obtain sizes of all MAC CEs or MAC SDUs, determine a position mapping relationship between the MAC CEs or MAC SDUs and data parts of CBs, and obtain a complete MAC CE or a complete MAC SDU in a correct CB based on the position mapping relationship 503: Deliver the entire TB to a MAC layer 507: The PHY layer delivers the complete MAC header and MAC CE or MAC SDU to the MAC layer

FIG. 12

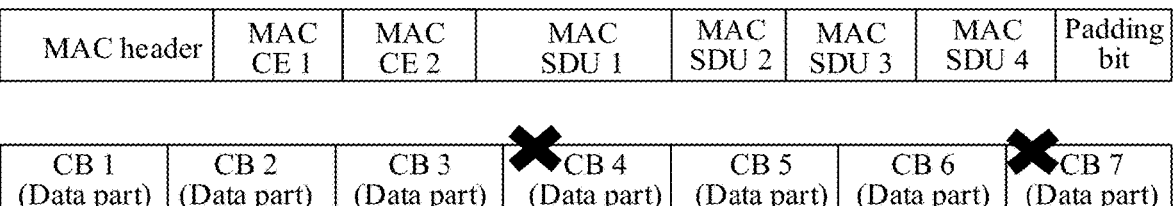

| MAC header | MAC CE 1 | MAC CE 2 | MAC SDU 1 | MAC SDU 2 | MAC SDU 3 | MAC SDU 4 | Padding bit |
|---|---|---|---|---|---|---|---|

| CB 1 (Data part) | CB 2 (Data part) | CB 3 (Data part) | CB 4 (Data part) | CB 5 (Data part) | CB 6 (Data part) | CB 7 (Data part) |
|---|---|---|---|---|---|---|

FIG. 13

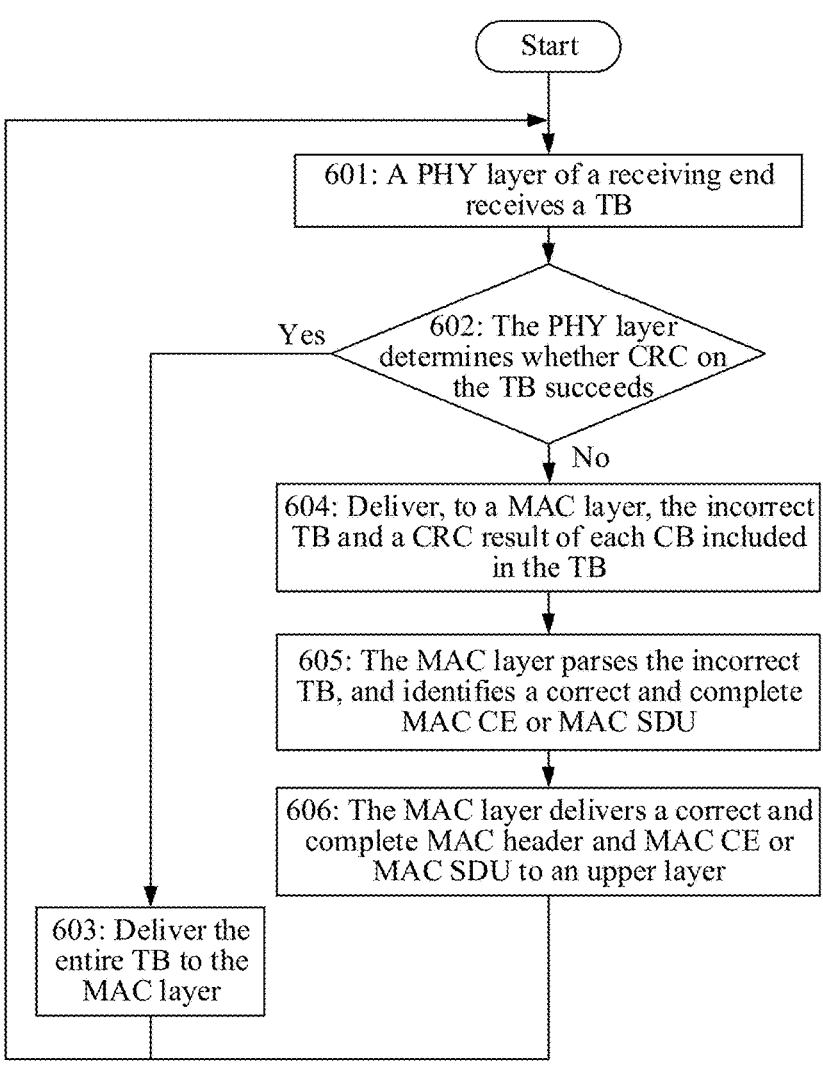

Start

601: A PHY layer of a receiving end receives a TB

602: The PHY layer determines whether CRC on the TB succeeds

Yes

No

604: Deliver, to a MAC layer, the incorrect TB and a CRC result of each CB included in the TB 605: The MAC layer parses the incorrect TB, and identifies a correct and complete MAC CE or MAC SDU 606: The MAC layer delivers a correct and complete MAC header and MAC CE or MAC SDU to an upper layer 603: Deliver the entire TB to the MAC layer

FIG. 14

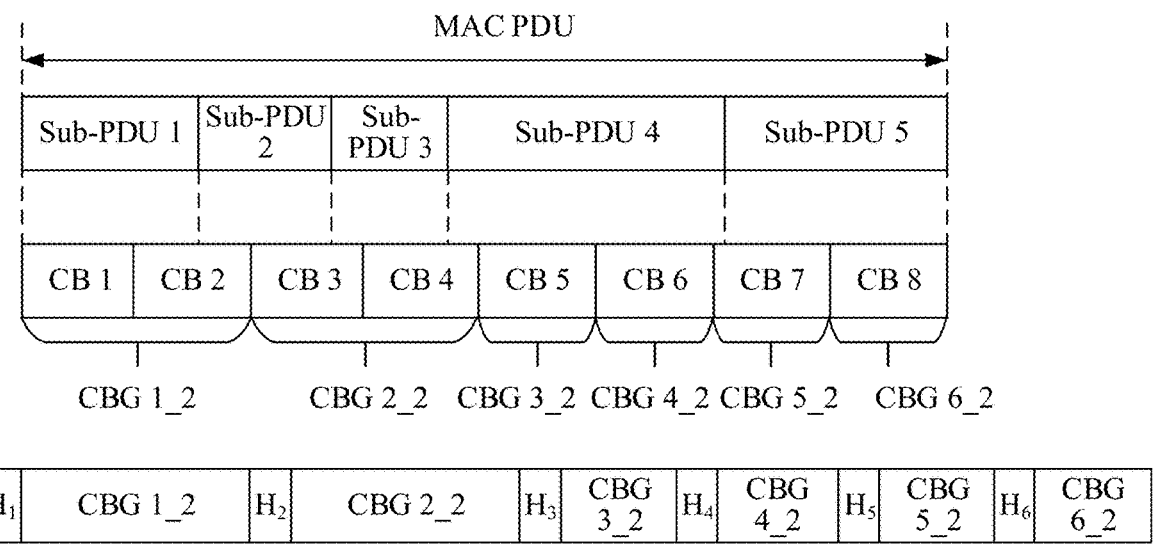
FIG. 18
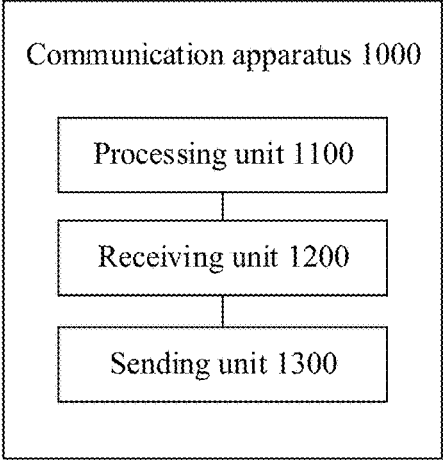
FIG. 19
Communication apparatus 1000
Processing unit 1100
Receiving unit 1200
Sending unit 1300
FIG. 20

1

DATA SENDING METHOD, DATA RECEIVING METHOD, AND COMMUNICATION APPARATUS

CROSS-REFERENCE TO RELATED APPLICATION

This application is a continuation application of International Patent Application No. PCT/CN2022/094860, filed on May 25, 2022, which claims priority to Chinese Patent Application No. 202110576174.2, filed on May 26, 2021. The disclosures of the aforementioned applications are hereby incorporated by reference in their entireties.

TECHNICAL FIELD

This application relates to the field of wireless communication technologies, and more specifically, to a data sending method, a data receiving method, and a communication apparatus.

BACKGROUND

An extended reality (XR) service in new radio (NR) realizes basic interaction between human and a virtual world. In the future, XR professional (XR pro), holography, and the like require immersive experience, which poses higher requirements on cellular communication. An average access rate increases from current 120 Mbps in 4K resolution to 2 Gbps in 16K resolution, and an interaction latency is further reduced from current 20 ms to about 5 ms. It can be learned that the XR service has characteristics and requirements of a low latency and a high rate.

In a current communication system, in a low-latency and high-rate XR service data transmission process, a physical layer determines whether a transport block (TB) is correct by using a cyclic redundancy check (CRC) code of the TB. When a CRC error occurs on the TB, the system retransmits the TB or a code block group (CBG).

However, retransmission of the TB or the CBG cannot be supported based on the low-latency requirement. The TB is determined as an error and is discarded. However, discarding a correct CB or CBG in the TB causes a loss of system performance. In this solution, it is difficult to support the high-rate and low-latency requirement of the XR service.

SUMMARY

This application provides a data sending method, a data receiving method, and a communication apparatus, to help improve performance of a wireless communication system, for example, improve a system throughput and reduce a latency.

According to a first aspect, a data sending method is provided, and may be applied to a transmitting end in wireless communication, or may be applied to a chip or a chip system of the transmitting end. For example, the method may be performed by a MAC layer of the transmitting end. The method includes:

obtaining a position mapping relationship between N sub-PDUs included in a MAC PDU and data parts of a plurality of code blocks CBs, where the plurality of CBs are obtained by dividing a TB, and each of the plurality of CBs includes header information and a data part; generating a data segment based on the position mapping relationship and the MAC PDU, where the data segment includes the header information and the data parts of the plurality of CBs, the data segment includes a plurality of sub-data segments, a quantity of the sub-data segments is equal to a quantity of CBs obtained by dividing the TB, each sub-data segment corresponds to one of the plurality of CBs obtained by dividing the TB, each sub-data segment includes a first part and a second part, the first part is header information of a CB corresponding to the sub-data segment, the second part is a data part of the CB corresponding to the sub-data segment, the second part includes a part or all of one or more of the N sub-PDUs, and a sum of lengths of respective second parts of the plurality of sub-data segments is equal to a length of the MAC PDU; and sending the TB, where the TB carries the data segment.

The plurality of CBs include a first CB, header information of the first CB indicates a position correspondence between a data part in the first CB and M sub-PDUs in the N sub-PDUs, both N and M are integers, $N \geq 1$, $M \geq 1$, and M is less than or equal to N.

Herein, how the header information of the first CB indicates the position mapping relationship between the data part of the first CB and the M sub-PDUs in the N sub-PDUs is described in detail in the following embodiments.

In other words, the header information of the first CB indicates a position of the data part of the first CB in the MAC PDU, or positions of the M sub-PDUs in the N sub-PDUs included in the MAC PDU in the data part of the first CB. It may be understood that indication content of the header information may vary with reference, but is essentially the same. According to the indication content of the header information provided in this application, other equivalent transformations that can be thought of by a person skilled in the art should also be considered as disclosure of this application.

It should be noted that the last CB in the plurality of CBs obtained by dividing the TB includes header information, a data part, and a CRC code of the TB. In other words, the data part of the last CB in the plurality of CBs does not include the CRC code of the TB. A CB other than the last CB in the plurality of CBs includes header information and a data part.

In the technical solutions provided in this application, the transmitting end generates, by obtaining the position mapping relationship between the N sub-PDUs included in the MAC PDU and the plurality of CBs obtained by dividing the TB, the data segment including the plurality of sub-data segments, where the quantity of sub-data segments is equal to the quantity of CBs obtained by dividing the TB, each sub-data segment corresponds to one of the plurality of CBs obtained by dividing the TB, and a first part of a sub-data segment is header information of a CB corresponding to the sub-data segment, and a second part is a data part of the CB corresponding to the sub-data segment. The transmitting end sends the TB that carries the data segment to a receiving end. After receiving the TB, if the TB is incorrect, the receiving end performs CRC by using a CB as a granularity, to obtain a correct CB. Further, the receiving end parses the correct CB to obtain header information of the correct CB, and may obtain a position mapping relationship between the correct CB and a sub-PDU based on an indication of the header information, so as to obtain a complete sub-PDU from the correct CB based on the position mapping relationship. This can implement obtaining of data at a granularity of a sub-PDU, and helps improve performance of a wireless communication system, for example, improve a system throughput and reduce a latency. For example, the technical solutions of this application are applicable to a service that requires a high rate and a low latency, for example, an XR service.

With reference to the first aspect, in some embodiments of the first aspect, the obtaining a position mapping relationship between N sub-PDUs included in a MAC PDU and data parts of a plurality of CBs obtained by dividing a TB includes: obtaining information about the MAC PDU, where the information about the MAC PDU includes a quantity of sub-PDUs included in the MAC PDU and a size of each sub-PDU; obtaining information about the TB, where the information about the TB includes a size of the TB, a quantity of CBs obtained by dividing the TB, and a size of each CB, and the size of each CB includes a length of the header information and a length of the data part; and determining the position mapping relationship based on the information about the MAC PDU and the information about the TB.

In this embodiment, the transmitting end obtains the information about the MAC PDU and the information about the TB, to determine the position mapping relationship between the N sub-PDUs included in the MAC PDU and the data parts of the plurality of CBs obtained by dividing the TB, and indicates the position mapping relationship to the receiving end by using the header information. After receiving the TB, if the TB is incorrect, the receiving end performs CRC by using a CB as a granularity, to obtain a correct CB. Further, the receiving end parses the correct CB to obtain header information of the correct CB, and may obtain a position mapping relationship between the correct CB and a sub-PDU based on an indication of the header information, so as to obtain a complete sub-PDU from the correct CB based on the position mapping relationship. This can implement obtaining of data at a granularity of a sub-PDU, and helps improve performance of a wireless communication system, for example, improve a system throughput and reduce a latency.

With reference to the first aspect, in some embodiments of the first aspect, one of the N sub-PDUs corresponds to a part or all of one or more NC data packets.

In this embodiment, the MAC PDU includes N sub-PDUs, and one sub-PDU may correspond to a part or all of one or more NC data packets. Therefore, the receiving end can deliver a correct NC data packet in the MAC PDU to an upper layer, so as to support fault tolerance delivery of an NC data packet in a sub-PDU, and improve fault tolerance performance of the communication system.

With reference to the first aspect, in some embodiments of the first aspect, the plurality of CBs are obtained by dividing the TB plus a CRC code, and the sending the TB includes: The MAC layer of the transmitting end sends the TB to a physical layer; the physical layer adds the CRC code to an end of the TB; and the physical layer sends the TB and the CRC code.

It should be understood that the plurality of CBs are obtained by dividing the TB plus the CRC code. Therefore, the last CB in the plurality of CBs includes the CRC code of the TB.

According to a second aspect, a data sending method is provided, and may be applied to a transmitting end in wireless communication, or may be applied to a chip or a chip system of the transmitting end. For example, the method may be performed by a physical layer (physical layer, or referred to as a PHY layer) of the transmitting end. The method includes:

obtaining a position mapping relationship between N sub-PDUs included in a MAC PDU carried by a first TB and data parts of a plurality of CBs, where the plurality of CBs are obtained by dividing a second TB, and each of the plurality of CBs includes header information and a data part; generating the second TB based on the position mapping relationship and the first TB; and sending the second TB.

The plurality of CBs include a first CB, header information of the first CB indicates a position correspondence between a data part in the first CB and M sub-PDUs in the N sub-PDUs, both N and M are integers, N≥1, M≥1, and M is less than or equal to N.

In the technical solution provided in this application, the transmitting end generates the second TB by obtaining the position mapping relationship between the N sub-PDUs included in the MAC PDU carried in the first TB and the plurality of CBs obtained by dividing the second TB, where each of the plurality of CBs obtained by dividing the second TB includes header information and a data part. Header information of a CB indicates a position mapping relationship between a data part of the CB and M sub-PDUs in the N sub-PDUs. The transmitting end sends the second TB to a receiving end. After receiving the second TB, if the second TB is incorrect, the receiving end performs, one by one by using a CB as a granularity, CRC on the plurality of CBs obtained by dividing the second TB, to obtain a correct CB in the plurality of CBs. Further, the receiving end parses the correct CB to obtain header information of the correct CB, and may obtain a position mapping relationship between the correct CB and a sub-PDU based on an indication of the header information, so as to obtain a complete sub-PDU from the correct CB based on the position mapping relationship. This can implement obtaining of data at a granularity of a sub-PDU, and helps improve performance of a wireless communication system, for example, improve a system throughput and reduce a latency. For example, the technical solutions of this application are applicable to a service that requires a high rate and a low latency, for example, an XR service.

With reference to the second aspect, in some embodiments of the second aspect, the obtaining a position mapping relationship between N sub-PDUs included in a MAC PDU carried by a first TB and data parts of a plurality of CBs includes: obtaining information about the MAC PDU, where the information about the MAC PDU includes a quantity of sub-PDUs included in the MAC PDU and a size of each sub-PDU; obtaining information about the second TB, where the information about the second TB includes a size of the second TB, a quantity of CBs obtained by dividing the second TB, and a size of each CB, and the size of each CB includes a length of the header information and a length of the data part; and determining the position mapping relationship based on the information about the MAC PDU and the information about the second TB.

In this embodiment, the transmitting end obtains the information about the MAC PDU and the information about the second TB, to determine the position mapping relationship between the N sub-PDUs included in the MAC PDU and the data parts of the plurality of CBs obtained by dividing the second TB, and indicates the position mapping relationship to the receiving end by using the header information, so that when an error occurs in the TB received by the receiving end from the transmitting end, the receiving end can perform CRC at a granularity of a CB, to obtain a correct CB. Further, the receiving end parses the correct CB to obtain header information of the correct CB, and may obtain a position mapping relationship between the correct CB and a sub-PDU based on an indication of the header information, so as to obtain a complete sub-PDU from the correct CB based on the position mapping relationship. This can implement obtaining of data at a granularity of a sub-PDU, and helps improve performance of a wireless communication system, for example, improve a system throughput and reduce a latency.

With reference to the second aspect, in some embodiments of the second aspect, the obtaining information about the MAC PDU includes: A physical layer of the transmitting end receives the MAC PDU from a MAC layer, where the MAC PDU includes the N sub-PDUs, and each sub-PDU includes one MAC sub-header; and the physical layer parses the MAC sub-headers of the N sub-PDUs to obtain length information of the N sub-PDUs. Alternatively, the obtaining information about the MAC PDU includes: The physical layer of the transmitting end receives indication information from the MAC layer, where the indication information indicates the information about the MAC PDU.

In this embodiment, the physical layer of the transmitting end parses the MAC sub-headers of the N sub-PDUs included in the MAC PDU from the MAC layer, to obtain information, for example, length information, about a sub-PDU corresponding to each MAC sub-header. Alternatively, the MAC layer of the transmitting end indicates, to the PHY layer, information about the N sub-PDUs included in the MAC PDU. After obtaining the information about the N sub-PDUs included in the MAC PDU, the PHY layer may determine, with reference to a known policy of dividing a TB into CBs, a position mapping relationship between a plurality of CBs obtained by dividing the TB and the N sub-PDUs, and indicate the position mapping relationship to the receiving end by using header information of each CB. Therefore, the receiving end may obtain the position mapping relationship by parsing the header information, so as to obtain a complete sub-PDU from a correct CB when the TB is incorrect, to improve performance of a communication system, for example, improve resource utilization and improve a throughput of the communication system.

According to a third aspect, a data receiving method is provided, and may be applied to a receiving end in wireless communication, or may be applied to a chip or a chip system of the receiving end. Herein, the receiving end is used as an example for description. The method includes:

the receiving end receives a TB from a transmitting end, where there is a position mapping relationship between data parts of a plurality of CBs obtained by dividing the TB and N sub-PDUs included in a corresponding MAC PDU, N≥1, and N is an integer; where the plurality of CBs include a first CB, and header information of the first CB indicates a position of a data part of the first CB in the MAC PDU, or the header information of the first CB indicates a position correspondence between the data part of the first CB and M sub-PDUs in the N sub-PDUs, M≥1, M is an integer, and M is less than or equal to N; and the receiving end obtains one or more complete sub-PDUs of the MAC PDU based on the position mapping relationship.

In the technical solutions provided in this application, after receiving the TB from the transmitting end, if the TB is incorrect, the receiving end performs CRC on the plurality of CBs obtained by dividing the TB, to obtain the correct CB in the plurality of CBs. Further, the receiving end parses the correct CB to obtain the header information of the correct CB. Because the header information of the CB indicates a position mapping relationship between the CB and a sub-PDU included in the MAC PDU, the receiving end may obtain the position mapping relationship between the correct CB and the sub-PDU based on an indication of the header information of the correct CB, so as to obtain a complete sub-PDU from the correct CB based on the position mapping relationship. This can implement obtaining of data at a granularity of a sub-PDU, and help improve performance of a wireless communication system, for example, improve a system throughput and reduce a latency. For example, the technical solutions of this application are applicable to a service that requires a high rate and a low latency, for example, an XR service.

With reference to the third aspect, in some embodiments of the third aspect, before the obtaining one or more complete sub-PDUs of the MAC PDU based on the position mapping relationship, the method further includes: performing CRC on the TB; and determining that CRC on the TB fails.

For example, after receiving the TB from the transmitting end, the receiving end first performs CRC on the TB, when the TB is incorrect, performs CRC on the plurality of CBs obtained by dividing the TB, to determine a correct CB, and obtains a complete sub-PDU from the correct CB, to implement data delivery at a sub-PDU granularity, thereby improving fault tolerance performance of a system.

With reference to the third aspect, in some embodiments of the third aspect, the obtaining one or more complete sub-PDUs of the MAC PDU based on the position mapping relationship includes: performing CRC on the plurality of CBs to obtain a correct CB in the plurality of CBs; parsing header information of the correct CB to obtain a local position mapping relationship between the correct CB and a sub-PDU that has a position correspondence with a data part of the correct CB; and obtaining a complete sub-PDU in the correct CB based on the local position mapping relationship.

The receiving end performs CRC on the TB received from the transmitting end. When the TB is incorrect, the receiving end performs CRC on the plurality of CBs obtained by dividing the TB at a granularity of a CB, to obtain a correct CB. Further, because the CB includes header information, each CB includes header information, and the header information indicates a position mapping relationship between the CB and the N sub-PDUs included in the MAC PDU, the receiving end may obtain a position mapping relationship between the correct CB and a sub-PDU by parsing the header information of the correct CB, so as to obtain a complete sub-PDU in the correct CB, thereby implementing data delivery at a sub-PDU granularity and improving fault tolerance performance of the system.

With reference to the third aspect, in some embodiments of the third aspect, the correct CB includes the first CB, the first CB includes a part of a first sub-PDU, a remaining part of the first sub-PDU and a second CB after the first CB have a position correspondence, the second CB is an incorrect CB, and the part of the first sub-PDU includes a start position of the first sub-PDU and a complete sub-header of the first sub-PDU.

The parsing header information of the correct CB to obtain a local position mapping relationship includes:

parsing the header information of the first CB, to obtain a position mapping relationship and length information of the first sub-PDU; reading the complete first sub-PDU based on the position mapping relationship of the first sub-PDU and the length information, and performing CRC on the complete first sub-PDU; and if CRC on the complete first sub-PDU is correct, obtaining the complete first sub-PDU.

In this embodiment, the header information of the first CB indicates the position mapping relationship between the first sub-PDU and the data part of the first CB. The receiving end parses the header information of the first CB, to obtain a position of the start position of the first sub-PDU in the first CB (that is, the position mapping relationship of the first sub-PDU), and obtains the complete sub-header of the first sub-PDU from the first CB. The length information of the first sub-PDU, length information of the CRC of the first sub-PDU, and the like are obtained by using the complete sub-header of the first sub-PDU. Further, the receiving end may read the complete first sub-PDU from the first CB, and perform CRC on the complete first sub-PDU. If the CRC succeeds, the complete first sub-PDU is obtained.

In addition, in another possible case, the first CB includes a start position of the first sub-PDU, but the first CB includes only a part of the sub-header of the first sub-PDU In other words, the first CB includes an incomplete sub-header of the first sub-PDU, and the other part of the sub-header of the first sub-PDU is included in the second CB after the first CB. In this case, when the first CB is correct, the receiving end further needs to determine whether the second CB is correct. If CRC on the second CB succeeds, the header information of the first CB and header information of the second CB are combined to obtain the complete sub-header of the first sub-PDU through parsing.

However, if the CRC on the second CB fails, the receiving end cannot obtain the complete sub-header of the first sub-PDU. In this case, it is considered that the first CB does not include a sub-header of a sub-PDU. Therefore, the receiving end cannot identify and obtain the complete first sub-PDU.

With reference to the first aspect to the third aspect, in the methods of the first aspect to the third aspect or any embodiment of the first aspect to the third aspect, the data part of the first CB includes start positions of Q sub-PDUs in the M sub-PDUs, the header information of the first CB indicates a position, in the data part of the first CB, of a start position of a sub-PDU that is in the Q sub-PDUs and whose start position is closest to a start position of the first CB, where $1 \leq Q \leq M$, and Q is an integer.

Alternatively, the data part of the first CB does not include a start position of any sub-PDU, and the header information of the first CB indicates that the first CB does not include a start position of a sub-PDU.

It should be noted that, when the data part of the first CB includes the start positions of the Q sub-PDUs, for example, the header information of the first CB may indicate an offset, relative to the start position of the data part of the first CB, of a start position of a sub-PDU that is in the Q sub-PDUs and that is closest to the start position of the first CB. Particularly, the offset value includes 0. For example, if the offset is represented by using an 8-bit offset field, when a value of the offset field is an all-0 sequence, it indicates that a start position of the $1^{st}$ sub-PDU in the Q sub-PDUs coincides with the start position of the data part of the first CB.

When the data part of the first CB has a position correspondence with only one sub-PDU (that is, M=1), and the data part of the first CB does not include a start position of the sub-PDU (that is, Q=0), the header information of the first CB indicates that the first CB does not include a start position of a sub-PDU.

With reference to the first aspect to the third aspect, in the methods of the first aspect to the third aspect or any embodiment of the first aspect to the third aspect, the header information of the first CB includes a flag field and an offset field, the flag field has a first value and a second value, the first value indicates that the first CB includes a start position of a sub-PDU, and the second value indicates that the first CB does not include a start position of a sub-PDU.

When the flag field is the first value, the offset field included in the header information of the first CB indicates an offset, relative to a start position of the data part of the first CB, of a start position of a sub-PDU that is in the sub-PDUs whose start positions fall within the first CB and that is closest to the start position of the first CB.

When the flag field is the second value, the offset field included in the header information of the first CB is an invalid field. The invalid field may not be parsed by the receiving end. Alternatively, the offset field may be an invalid value.

Alternatively, in this embodiment of this application, a start position of a sub-PDU is sometimes described as a start bit of the sub-PDU. It may be understood that the start position may also be a start byte, or another start data unit that may represent the start position. This is not limited herein.

With reference to the first aspect to the third aspect, in the methods of the first aspect to the third aspect or any embodiment of the first aspect to the third aspect, the header information of the first CB includes an offset field, and the offset field has a valid value and an invalid value.

When the offset field is the valid value, the valid value indicates that the first CB includes a start position of a sub-PDU, and the valid value indicates an offset, relative to a start position of the data part of the first CB, of a start position of a sub-PDU that is in the sub-PDUs whose start positions fall within the first CB and that is closest to the start position of the first CB.

When the offset field is the invalid value, the invalid value indicates that the first CB does not include a start position of a sub-PDU, and the invalid value indicates an invalid offset.

In the foregoing two embodiments, the header information of the CB includes the flag field and the offset field, or the header information includes the offset field. The two fields or one field may be used to indicate a position mapping relationship between a CB and a sub-PDU. In this way, when a TB is incorrect, the receiving end can perform CRC at a granularity of a CB, obtain a complete sub-PDU from a correct CB, and implement data delivery at a granularity of a sub-PDU, thereby improving fault tolerance performance of a communication system.

In addition, in this embodiment, the header information may indicate the position mapping relationship by using only a small quantity of fields (for example, one field or two fields), so that indication overheads can be reduced.

With reference to the first aspect to the third aspect, in the methods of the first aspect to the third aspect or any embodiment of the first aspect to the third aspect, the header information of the first CB includes an end position field and a length field, where the end position field indicates a position of an end position of the data part in the first CB in a corresponding sub-PDU, and the length field indicates a length of the sub-PDU in which the end position of the data part in the first CB is located. For example, the end position field indicates a remaining length of the sub-PDU in which the end position of the data part of the first CB is located.

In some embodiments, the remaining length of the sub-PDU in which the end position of the data part of the first CB is located is not limited to a unit of length. For example, the remaining length may be a quantity of remaining bits or a quantity of remaining bytes of the sub-PDU in which the end position is located, or may be another unit.

In this embodiment, the header information of the CB includes the end position field and the length field, and the two fields may indicate a position mapping relationship between the CB and a sub-PDU. This can support a receiving end in obtaining a complete sub-PDU from a correct CB when a TB is incorrect, and implement data delivery at a sub-PDU granularity, thereby improving to fault tolerance performance of a communication system. In addition, in this embodiment, indication overheads of the header information can be reduced.

With reference to the first aspect to the third aspect, in the methods of the first aspect to the third aspect or any embodiment of the first aspect to the third aspect, the header information of the first CB includes a start position field and a length field, the start position field indicates a position of a start position of the data part of the first CB in a corresponding sub-PDU, and the length field indicates a length of the sub-PDU in which the start position of the data part of the first CB is located.

For example, the start position field indicates a length between the position of the start position of the data part in the first CB in the corresponding sub-PDU and a start position of the sub-PDU.

In some embodiments, a length between a position of a start position of a data part in a CB in a corresponding sub-PDU and a start position of the sub-PDU is not limited to a unit of length. For example, the length may be represented by a quantity of bits, or may be represented by a quantity of bytes.

In this embodiment, the header information of the CB includes the start position field and the length field. The two fields may indicate a position mapping relationship between the CB and a sub-PDU, so that the receiving end can obtain a complete sub-PDU from a correct CB when a TB is incorrect, thereby implementing data delivery at a sub-PDU granularity, and improving fault tolerance performance of a communication system. In addition, in this embodiment, indication overheads of the header information can be reduced.

According to a fourth aspect, a communication apparatus is provided, including a function of implementing the method in any one of the first aspect or the possible embodiments of the first aspect, or a function of implementing the method in any one of the second aspect or the possible embodiments of the second aspect. The function may be implemented by hardware, or may be implemented by hardware executing corresponding software. The hardware or the software includes one or more units corresponding to the foregoing functions.

In some embodiments, the communication apparatus according to the fourth aspect includes:

a receiving unit, configured to obtain a position mapping relationship between N sub-PDUs included in a MAC PDU and data parts of a plurality of CBs, where the plurality of CBs are obtained by dividing a TB, and each of the plurality of CBs includes header information and a data part;

a processing unit, configured to generate a data segment based on the position mapping relationship and the MAC PDU, where the data segment includes the header information and the data parts of the plurality of CBs, the data segment includes a plurality of sub-data segments, a quantity of the sub-data segments is equal to a quantity of CBs obtained by dividing the TB, each sub-data segment corresponds to one of the plurality of CBs obtained by dividing the TB, each sub-data segment includes a first part and a second part, the first part is header information of a CB corresponding to the sub-data segment, the second part is a data part of the CB corresponding to the sub-data segment, the second part includes a part or all of one or more of the N sub-PDUs, and a sum of lengths of respective second parts of the plurality of sub-data segments is equal to a length of the MAC PDU; and a sending unit, configured to send the TB, where the TB carries the data segment.

The plurality of CBs include a first CB, header information of the first CB indicates a position correspondence between a data part in the first CB and M sub-PDUs in the N sub-PDUs, both N and M are integers, N≥1, M≥1, and M is less than or equal to N.

In an embodiment, the processing unit is configured to:

obtain information about the MAC PDU, where the information about the MAC PDU includes a quantity of sub-PDUs included in the MAC PDU and a size of each sub-PDU;

obtain information about the TB, where the information about the TB includes a size of the TB, a quantity of CBs obtained by dividing the TB, and a size of each CB, and the size of each CB includes a length of the header information and a length of the data part; and determine the position mapping relationship based on the information about the MAC PDU and the information about the TB.

In an embodiment, one of the N sub-PDUs corresponds to a part or all of one or more network coding NC data packets.

In an embodiment, the plurality of CBs are obtained by dividing the TB plus a CRC code, and the sending unit is further configured to send the TB to a physical layer through a MAC layer.

The processing unit is further configured to add a CRC code to the end of the TB by using the physical layer.

The sending unit is further configured to send the TB and the CRC code through the physical layer.

In some embodiments, the communication apparatus according to the fourth aspect includes:

a receiving unit, configured to obtain a position mapping relationship between N sub-PDUs included in a MAC PDU carried by a first TB and data parts of a plurality of CBs, where the plurality of CBs are obtained by dividing a second TB, and each of the plurality of CBs includes header information and a data part;

a processing unit, configured to generate the second TB based on the position mapping relationship and the first TB; and a sending unit, configured to send the second TB.

The plurality of CBs include a first CB, header information of the first CB indicates a position correspondence between a data part in the first CB and M sub-PDUs in the N sub-PDUs, both N and M are integers, N≥1, M≥1, and M is less than or equal to N.

In an embodiment, the processing unit is configured to:

obtain information about the MAC PDU, where the information about the MAC PDU includes a quantity of sub-PDUs included in the MAC PDU and a size of each sub-PDU;

obtain information about the second TB, where the information about the second TB includes a size of the second TB, a quantity of CBs obtained by dividing the second TB, and a size of each CB, and the size of each CB includes a length of the header information and a length of the data part; and determine the position mapping relationship based on the information about the MAC PDU and the information about the second TB.

In an embodiment, the receiving unit is configured to receive the MAC PDU from a MAC layer through a physical layer, where the MAC PDU includes the N sub-PDUs, and each sub-PDU includes one MAC sub-header.

The processing unit is configured to parse the MAC sub-headers of the N sub-PDUs by using the physical layer to obtain length information of the N sub-PDUs.

Alternatively, the receiving unit is configured to receive indication information from the MAC layer through the physical layer, where the indication information indicates the information about the MAC PDU.

According to a fifth aspect, a communication apparatus is provided, including a function of implementing the method in any one of the third aspect or the possible embodiments of the third aspect. The function may be implemented by hardware, or may be implemented by hardware executing corresponding software. The hardware or the software includes one or more units corresponding to the foregoing functions.

In some embodiments, the communication apparatus according to the fifth aspect includes:

a receiving unit, configured to receive a TB from a transmitting end, where there is a position mapping relationship between data parts in a plurality of CBs obtained by dividing the TB and N sub-PDUs included in a MAC PDU, N≥1, and N is an integer; where the plurality of CBs include a first CB, header information of the first CB indicates a position correspondence between a data part in the first CB and M sub-PDUs in the N sub-PDUs, M≥1, M is an integer, and M is less than or equal to N; and a processing unit, configured to obtain one or more complete sub-PDUs of the MAC PDU based on the position mapping relationship.

In an embodiment, the processing unit is further configured to:

perform CRC on the TB; and determine that the CRC on the TB fails.

In an embodiment, the processing unit is configured to:

perform CRC on the plurality of CBs to obtain a correct CB in the plurality of CBs;

parse header information of the correct CB to obtain a local position mapping relationship between the correct CB and a sub-PDU that has a position correspondence with a data part of the correct CB; and obtain a complete sub-PDU in the correct CB based on the local position mapping relationship.

In an embodiment, the correct CB includes a first CB, the first CB includes a part of a first sub-PDU, a remaining part of the first sub-PDU and a second CB after the first CB have a position correspondence, the second CB is an incorrect CB, and the part of the first sub-PDU includes a start position of the first sub-PDU and a complete sub-header of the first sub-PDU.

The processing unit is configured to:

parse the header information of the first CB to obtain the sub-header of the first sub-PDU and a position mapping relationship of the first sub-PDU, where the sub-header of the first sub-PDU includes length information of the first sub-PDU;

read the complete first sub-PDU based on the position mapping relationship of the first sub-PDU and the length information, and perform CRC on the complete first sub-PDU; and obtain the complete first sub-PDU if the CRC on the complete first sub-PDU succeeds.

In an embodiment, the data part of the first CB includes start positions of Q sub-PDUs in the M sub-PDUs, the header information of the first CB indicates a position, in the data part of the first CB, of a start position of a sub-PDU that is in the Q sub-PDUs and whose start position is closest to a start position of the first CB, 1≤Q≤M, and Q is an integer.

Alternatively, the data part of the first CB does not include a start position of any sub-PDU, and the header information of the first CB indicates that the first CB does not include a start position of a sub-PDU.

In an embodiment, the header information of the first CB includes a flag field and an offset field, the flag field has a first value and a second value, the first value indicates that the first CB includes a start position of a sub-PDU, and the second value indicates that the first CB does not include a start position of a sub-PDU.

When the flag field is the first value, the offset field included in the header information of the first CB indicates an offset, relative to a start position of the data part of the first CB, of a start position of a sub-PDU that is in the sub-PDUs whose start positions fall within the first CB and that is closest to the start position of the first CB.

When the flag field is the second value, the offset field included in the header information of the first CB is an invalid field. The invalid field may not be parsed by the receiving end.

In an embodiment, the header information of the first CB includes an offset field, and the offset field has a valid value and an invalid value.

When the offset field is the valid value, the valid value indicates that the first CB includes a start position of a sub-PDU, and the valid value indicates an offset, relative to a start position of the data part of the first CB, of a start position of a sub-PDU that is in the sub-PDUs whose start positions fall within the first CB and that is closest to the start position of the first CB.

When the offset field is the invalid value, the invalid value indicates that the first CB does not include a start position of a sub-PDU, and the invalid value indicates an invalid offset.

According to a sixth aspect, a communication apparatus is provided, including a processor and a memory. In some embodiments the apparatus may further include a transceiver. The memory is configured to store a computer program, and the processor is configured to invoke and run the computer program stored in the memory, and control the transceiver to receive and send signals, so that the communication apparatus performs the method according to any one of the first aspect or the possible embodiments of the first aspect, or the communication apparatus performs the method according to any one of the second aspect or the possible embodiments of the second aspect.

For example, the communication apparatus is a transmitting end in wireless communication.

According to a seventh aspect, a communication apparatus is provided, including a processor and a memory. In some embodiments the apparatus may further include a transceiver. The memory is configured to store a computer program. The processor is configured to: invoke and run the computer program stored in the memory, and control the transceiver to receive and send signals, so that the communication apparatus performs the method in any one of the third aspect or the possible embodiments of the third aspect.

For example, the communication apparatus is a receiving end in wireless communication.

According to an eighth aspect, a communication apparatus is provided, including a processor and a communication interface, where the communication interface is configured to receive data and/or information, and transmit the received data and/or information to the processor, the processor processes the data and/or information, and the communication interface is further configured to output data and/or information processed by the processor, so that the method in any one of the first aspect or the possible embodiments of the first aspect is performed, or the method in any one of the second aspect or the possible embodiments of the second aspect is performed.

According to a ninth aspect, a communication apparatus is provided, including a processor and a communication interface. The communication interface is configured to receive (or referred to as input) data and/or information, and transmit the received data and/or information to the processor. The processor processes the data and/or information. The communication interface is further configured to output data and/or information processed by the processor, so that the method in any one of the third aspect or the possible embodiments of the third aspect is performed.

According to a tenth aspect, this application provides a computer-readable storage medium. The computer-readable storage medium stores computer instructions. When the computer instructions are run on a computer, the method according to any one of the first aspect or the possible embodiments of the first aspect is performed, or the method according to any one of the second aspect or the possible embodiments of the second aspect is performed.

According to an eleventh aspect, this application provides a computer-readable storage medium. The computer-readable storage medium stores computer instructions. When the computer instructions are run on a computer, the method according to any one of the third aspect or the possible embodiments of the third aspect is performed.

According to a twelfth aspect, this application provides a computer program product. The computer program product includes computer program code. When the computer program code is run on a computer, the method according to any one of the first aspect or the possible embodiments of the first aspect is performed, or the method according to any one of the second aspect or the possible embodiments of the second aspect is performed.

According to a thirteenth aspect, this application provides a computer program product. The computer program product includes computer program code. When the computer program code is run on a computer, the method according to any one of the third aspect or the possible embodiments of the third aspect is performed.

According to a fourteenth aspect, a wireless communication system is provided, including the communication apparatus according to the fourth aspect, the sixth aspect, or the eighth aspect, and/or the communication apparatus according to the fifth aspect, the seventh aspect, or the ninth aspect.

BRIEF DESCRIPTION OF DRAWINGS

FIG. 1 is a diagram of a scenario of a communication system applicable to this application;
FIG. 2 is a flowchart of a data sending method according to this application;
FIG. 4 is another flowchart of a data sending method according to this application;

FIG. 11 is a procedure of receiving data by a receiving end according to this application;
FIG. 12 is a diagram of a data delivery solution of a receiving end according to this application;
FIG. 13 is an example of a data delivery solution of a receiving end according to this application;
FIG. 14 is a diagram of another data delivery solution of a receiving end according to this application;
FIG. 18 is an example of a position mapping relationship between CBGs and sub-PDUs according to this application;
FIG. 19 is an example in which a receiving end delivers data based on a position mapping relationship between CBGs and sub-PDUs;
FIG. 20 is a block diagram of a communication apparatus according to this application.

DESCRIPTION OF EMBODIMENTS

Figure 3:
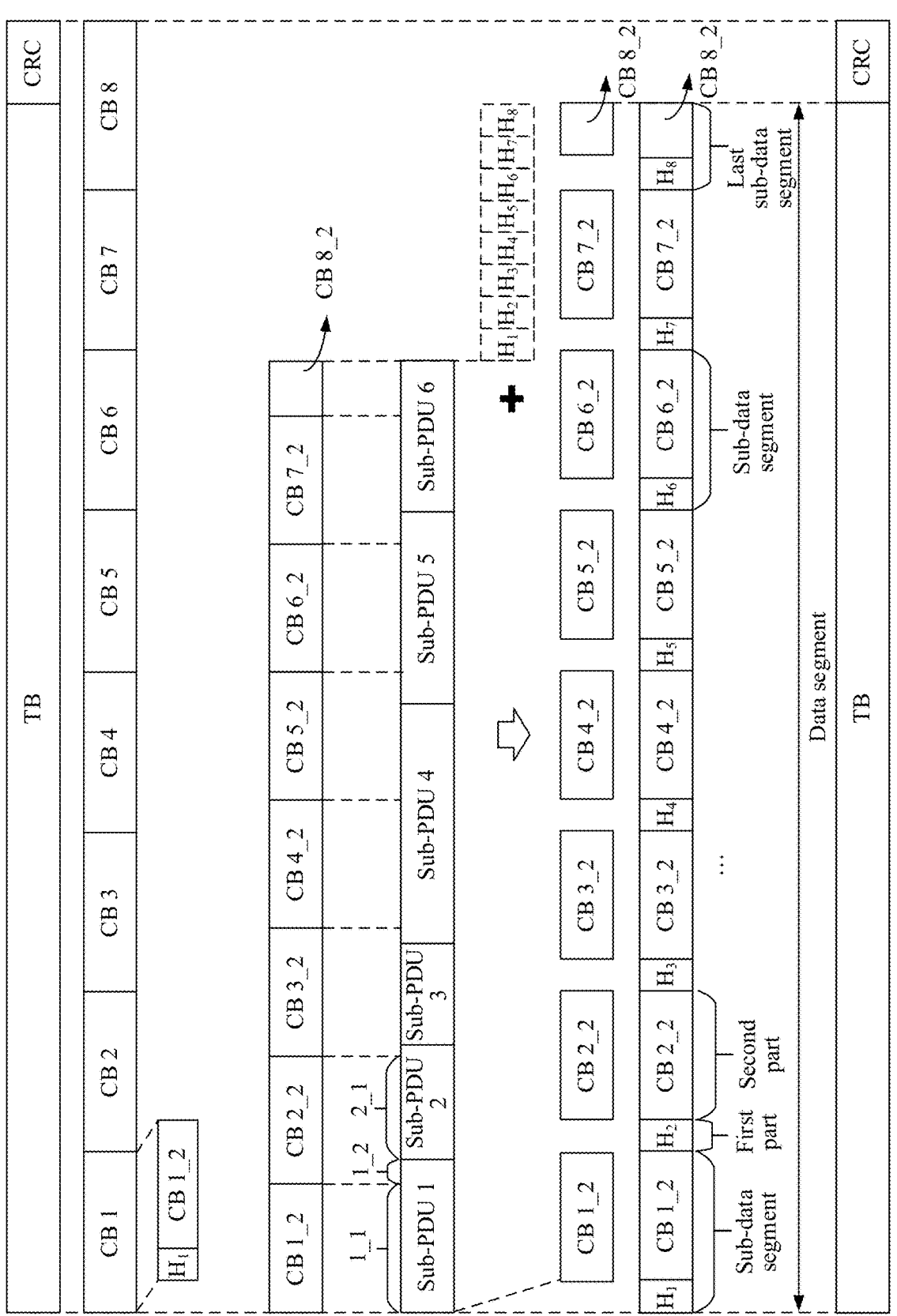
FIG. 3 is a diagram of a process of generating a data segment by a MAC layer.

The following describes technical solutions of embodiments in this application with reference to accompanying drawings.

The technical solutions in the embodiments of this application may be applied to various communication systems, including but not limited to the 5th generation (5G) system or a new radio (NR) system, a long term evolution (LTE) system, an LTE frequency division duplex (FDD) system, an LTE time division duplex (TDD) system, and the like. The technical solutions provided in this application may be further applied to a future communication system, for example, a sixth generation mobile communication system. In addition, the technical solutions may be further applied to a device to device (D2D) communication system, a vehicle-to-everything (V2X) communication system, a machine to machine (M2M) communication system, a machine type communication (MTC) system, an internet of things (IoT) communication system, another communication system, and the like.

A communication system applicable to this application may include one or more transmitting ends and one or more receiving ends. In some embodiments one of the transmitting end and the receiving end may be a terminal device, and the other may be a network device.

For example, the terminal device may also be referred to as user equipment UE), an access terminal, a subscriber unit, a subscriber station, a mobile console, a mobile station (MS), a mobile terminal (MT), a remote station, a remote terminal, a mobile device, a user terminal, a terminal, a wireless communication device, a user agent, or a user apparatus. The terminal device in the embodiments of this application may be a device that provides a user with voice and/or data connectivity, and may be configured to connect a person, an object, and a machine, for example, a handheld device or a vehicle-mounted device with a wireless connection function. The terminal device in the embodiments of this application may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery (remote medical surgery), a wireless terminal in a smart grid, a wireless terminal in transportation safety, a wireless terminal in a smart city, a wireless terminal in a smart home, or the like. In some embodiments, the UE may act as a base station. For example, the UE may act as a scheduling entity that provides sidelink signals between UEs in V2X, D2D, or the like.

In the embodiments of this application, an apparatus configured to implement a function of a terminal may be a terminal, or may be an apparatus, for example, a chip system or a chip, that can support the terminal in implementing the function. The apparatus may be installed in the terminal. In embodiments of this application, the chip system may include a chip, or may include a chip and another discrete component.

For example, the network device may be a device having a wireless transceiver function. The network device may be a device providing a wireless communication function service, and is usually located on a network side, including but not limited to a next generation base station (gNodeB, gNB) in the 5th generation (5G) communication system, a base station in the 6th generation (6G) mobile communication system, a base station in a future mobile communication system, an access node in a wireless fidelity (Wi-Fi) system, an evolved nodeB (eNB) in a long term evolution (LTE) system, a radio network controller (RNC), a nodeB (NB), a base station controller (BSC), a home base station (for example, a home evolved NodeB, or a home NodeB, HNB), a baseband unit (BBU), a transmission reception point (TRP), a transmitting point (TP), a base transceiver station (BTS), or the like. In a network structure, the network device may include a centralized unit (CU) node, a distributed unit (DU) node, a RAN device including a CU node and a DU node, or a RAN device including a control plane CU node, a user plane CU node, and a DU node. Alternatively, the network device may be a radio controller in a cloud radio access network (CRAN) scenario, a relay station, a vehicle-mounted device, a wearable device, or the like. In addition, the base station may be a macro base station, a micro base station, a relay node, a donor node, or a combination thereof. The base station may be a communication module, a modem, or a chip that is disposed in the foregoing device or apparatus. The base station may alternatively be a mobile switching center, a device that bears a base station function in D2D, V2X, and M2M communication, a network side device in a 6G network, a device that bears a base station function in a future communication system, or the like. The base station may support networks of a same access technology or different access technologies. This is not limited.

In the embodiments of this application, an apparatus configured to implement network device functions may be a network device, or may be an apparatus that can support the network device in implementing the functions, for example, a chip system or a chip. The apparatus may be installed in the network device. In this embodiment of this application, the chip system may include a chip, or may include a chip and another discrete component.

In addition, the technical solutions of this application may be applied to a plurality of mobile communication scenarios, for example, point-to-point transmission between a base station and UE or between UEs, relay transmission between a base station and UE, or dual connectivity (DC) or multi-connection between a plurality of base stations and UE.

FIG. 1 is a diagram of a scenario of a communication system applicable to this application. This application is applicable to a plurality of transmission scenarios such as an uplink, a downlink, an access link, a backhaul link, and a sidelink, for example, a point-to-point single connection shown in (a) in FIG. 1, a multi-hop single connection shown in (b) in FIG. 1, a DC dual connection shown in (c) in FIG. 1, and a multi-hop multi-connection shown in (d) in FIG. 1.

In addition, from a perspective of a service scenario, the solutions in this application are applicable to many scenarios, including but not limited to scenarios such as a data coding scenario and an uplink large-capacity scenario in an extended reality (XR) service or XR pro.

In a current communication system, after CRC on a TB fails, a receiving end retransmits a TB or a code block group (CBG). However, when a low-latency service requirement cannot support TB retransmission or CBG retransmission, the TB is considered to be incorrect, but data of most CBs in the incorrect TB or the incorrect CBG is usually correct. Direct discarding of the TB causes obvious deterioration of system transmission performance (for example, one or more of a rate, a latency, a throughput, a block error rate, and resource utilization).

Therefore, this application provides a data sending method and a data receiving method. If CRC on a TB fails, a receiving end performs CRC determining and data delivery by using a CB or a CBG as a granularity, to help meet a requirement of a high-rate low-latency service (for example, an XR service).

This application provides some embodiment solutions for a structure of a medium access control protocol data unit (MAC PDU) in NR.

The structure of a MAC PDU in NR is used as an example. One MAC PDU includes a plurality of sub-PDUs. A receiving end may perform CRC determining by using a CB or a CBG as a granularity, and perform data delivery by using a sub-PDU as a granularity. Using a CB as a granularity for CRC determining and using a sub-PDU as a granularity for data delivery is merely used as an example for description in the following.

In some embodiment solutions provided in this application, a transmitting end performs some processing (described in detail below) on data, so that when CRC on a TB received from the transmitting end fails, the receiving end can perform CRC determining and data delivery at a granularity of a CB.

In some embodiments, processing of the transmitting end may be performed at a medium access control (MAC) layer, or may be performed at a physical layer. The physical layer is also referred to as a PHY layer for short, and is separately described below.

In an embodiment solution, data processing performed by the transmitting end may be performed by a MAC layer.

(1) Processing at the MAC Layer

FIG. 2 is a flowchart of a data sending method according to this application.

210: A MAC layer of a transmitting end obtains a position mapping relationship between N sub-PDUs included in a MAC PDU and data parts of a plurality of CBs, where the plurality of CBs are obtained by dividing a TB. Specifically, the plurality of CBs are obtained by dividing the TB and a CRC code of the TB. Each of the plurality of CBs includes header information and a data part.

The plurality of CBs include a first CB. For example, header information of the first CB indicates a position of a data part of the first CB in the MAC PDU, or the header information of the first CB indicates a position correspondence between the data part of the first CB and M sub-PDUs in the N sub-PDUs, where both N and M are integers, $N \geq 1$, $M \geq 1$, and M is less than or equal to N.

It should be understood that the first CB may be any one of the plurality of CBs included in the TB.

In some embodiments, the position correspondence between the data part of the first CB and the M sub-PDUs includes that the data part of the first CB corresponds to a part of M sub-PDUs, or the data part of the first CB corresponds to all of the M sub-PDUs.

For example, if the data part of the first CB comes from the M sub-PDUs, a start position of the data part of the first CB coincides with a start position of the $1^{st}$ sub-PDU in the M sub-PDUs, and an end position of the data part of the first CB coincides with an end position of the last sub-PDU in the M sub-PDUs, it is considered that the data part of the first CB corresponds to all of the M sub-PDUs.

If the data part of the first CB comes from the M sub-PDUs, and one of the following cases is met, it is considered that the data part of the first CB corresponds to a part of the M sub-PDUs:

the data part of the first CB does not include the start position of the $1^{st}$ sub-PDU in the M sub-PDUs, and the end position of the data part of the first CB coincides with the end position of the last sub-PDU in the M sub-PDUs; or the start position of the data part of the first CB coincides with the start position of the M sub-PDUs, and the data part of the first CB does not include the end position of the last sub-PDU in the M sub-PDUs; or the data part of the first CB does not include the start position of the $1^{st}$ sub-PDU in the M sub-PDUs, and does not include the end position of the last sub-PDU in the M sub-PDUs. In other words, the start position of the data part of the first CB is after the start position of the $1^{st}$ sub-PDU, and the end position of the data part of the first CB is before the end position of the last sub-PDU. In this case, it is considered that the first CB corresponds to a part of the M sub-PDUs.

For example, after obtaining information about the MAC PDU and information about the TB, the MAC layer may determine the position mapping relationship based on the information about the MAC PDU and the information about the TB.

The information about the MAC PDU includes a quantity of sub-PDUs included in the MAC PDU and a size of each sub-PDU. The information about the TB includes a size of the TB, a quantity of CBs obtained by dividing the TB, and a size of each CB, and the size of each CB includes a length of header information of the CB and a length of a data part of the CB.

In an embodiment, the MAC knows (for example, preconfigures) a policy of dividing the TB into CBs, and therefore may obtain, through calculation, the position mapping relationship between the N sub-PDUs included in the MAC PDU and the data parts of the plurality of CBs obtained by dividing the TB.

220: The MAC layer of the transmitting end generates a data segment based on the position mapping relationship and the MAC PDU, where the data segment includes the header information and the data parts of the plurality of CBs.

Specifically, the data segment includes a plurality of sub-data segments, and a quantity of the sub-data segments is equal to the quantity of CBs obtained by dividing the TB. Each sub-data segment corresponds to one of the plurality of CBs, each sub-data segment includes a first part and a second part, the first part is header information of a CB corresponding to the sub-data segment, and the second part includes a part or all of one or more sub-PDUs in the N sub-PDUs. In other words, a second part of a sub-data segment is a data part of a CB corresponding to the sub-data segment. A data part of the last CB in the plurality of CBs does not include the CRC code of the TB. A sum of lengths of respective second parts of the plurality of sub-data segments is equal to a length of the MAC PDU.

It can be learned from the foregoing that a data part of one CB may correspond to a part of M sub-PDUs in the N sub-PDUs, or correspond to all of the M sub-PDUs.

A second part of a sub-data segment is a data part of a CB corresponding to the sub-data segment. It can be learned from this that a second part of a sub-data segment may come from a part or all of the M sub-PDUs in the N sub-PDUs.

For example, if a second part of a sub-data segment corresponds to a data part of a CB, and the data part of the CB corresponds to an entire sub-PDU, the second part of the sub-data segment includes the entire sub-PDU in the N sub-PDUs.

For another example, if a second part of a sub-data segment corresponds to a data part of a CB, and the data part of the CB corresponds to a part of a sub-PDU, the second part of the sub-data segment includes the part of the sub-PDU in the N sub-PDUs.

For another example, if a second part of a sub-data segment corresponds to a data part of a CB, and the data part of the CB corresponds to all of M sub-PDUs, the second part of the sub-data segment includes all of the M sub-PDUs in the N sub-PDUs. M is greater than 1.

For another example, if a second part of a sub-data segment corresponds to a data part of a CB, and the data part of the CB corresponds to a part of M sub-PDUs, the second part of the sub-data segment includes the part of the M sub-PDUs in the N sub-PDUs. M is greater than 1.

It should be understood that M is greater than 1, that is, the second part of the sub-data segment includes a plurality of sub-PDUs in the N sub-PDUs.

Alternatively, the position mapping relationship may also be understood as a position mapping relationship between the N sub-PDUs included in the MAC PDU and the second parts of the plurality of sub-data segments included in the data segment.

FIG. 3 is a diagram of a process of generating a data segment by a MAC layer. As shown in FIG. 3, the MAC PDU includes six sub-PDUs, that is, N=6. According to a policy of dividing a TB into CBs, one TB plus a CRC code is divided into eight CBs, which are respectively denoted as CB 1 to CB 8. Sizes of CB 1 to CB 8 may be all equal or partially equal, or may be unequal to each other. Each of CB 1 to CB 7 includes header information and a data part, and the last CB (that is, CB 8) includes header information, a data part, and a CRC code. In other words, the data part of the last CB in the plurality of CBs obtained by dividing the TB does not include the CRC code of the TB. CB 1 shown in FIG. 3 is used as an example. The header information and the data part of CB 1 are respectively represented as CB 1_1 and CB 1_2, and other CBs are similar. For example, CB i_1 represents header information of CB i, which may also be represented as $H_i$, and CB 1_2 represents a data part of CB i, where i=1, 2, 3, . . . , 8. The MAC layer determines a position mapping relationship between sub-PDU 1 to sub-PDU 6 and the data parts of CB 1 to CB 8 based on a size of each sub-PDU in sub-PDU 1 to sub-PDU 6 and a size of each CB in CB 1 to CB 8. Further, the MAC layer generates a data segment based on the position mapping relationship. The data segment includes eight sub-data segments, and each sub-data segment corresponds to one CB. Each sub-data segment includes a first part and a second part. A first part of a sub-data segment is header information of a CB corresponding to the sub-data segment, and a second part includes a part or all of one or more sub-PDUs of the N sub-PDUs included in the MAC PDU. In other words, the second part of each sub-data segment includes a part or all of M sub-PDUs that have a correspondence with a data part of a CB corresponding to the sub-data segment. A second part of a sub-data segment is a data part of a CB corresponding to the sub-data segment. A sum of sizes of sub-PDU 1 to sub-PDU 6 is equal to a sum of sizes of the data parts of CB 1 to CB 8.

FIG. 3 is used as an example. The figure shows eight sub-data segments, and a first part of each sub-data segment is $H_i$ that has a fixed length and a fixed format shown in FIG. 3, for example, $H_1$, or $H_2$. According to an order from left to right of the sub-data segments, the first sub-data segment includes $H_1$ and a part (specifically, sub-PDU 1_1) of sub-PDU 1 that has a position correspondence with the data part (that is, CB 1_2) of CB 1. In other words, the first sub-data segment includes $H_1$ and sub-PDU 1_1. The second sub-data segment includes $H_2$, sub-PDU 1_2, and sub-PDU 2_1. Here, sub-PDU 1_2 represents a remaining part of sub-PDU 1 excluding PDU 1_1, and sub-PDU 2_1 represents a part that is of sub-PDU 2 and that has a position correspondence with the data part of CB 2.

For simplicity, in FIG. 3, sub-PDU 1_1 is represented as 1_1, sub-PDU 1_2 is represented as 1_2, and sub-PDU 2_1 is represented as 2_1.

It should be noted that CB 1 to CB 8 are obtained by dividing the CBs after a CRC code of a length (for example, 16 bits or 24 bits) is added to the end of the TB. Therefore, the last CB (CB 8 shown in FIG. 3) in the plurality of CBs obtained by dividing the TB plus the CRC code includes the CRC code of the TB. CB 8 in FIG. 3 is used as an example for description. The complete CB 8 includes CB 8_1, CB 8_2, and the CRC code. However, when the data segment is generated, because of a size of the CRC code of the TB, the second part of the last sub-data segment is a data part of a CB corresponding to the sub-data segment, that is, the second part of the last sub-data segment is CB 8_2.

230: The MAC layer of the transmitting end sends the TB, where the TB carries the data segment.

The MAC layer of the transmitting end sends the TB. "Send" herein may mean that the MAC layer of the transmitting end sends content of the data segment to a physical layer in a form of a TB.

240: The physical layer of the transmitting end adds a CRC code to the end of the TB.

250: The physical layer of the transmitting end sends the TB and the CRC code.

In another embodiment solution, data processing performed by the transmitting end may be performed by the PHY layer.

(2) Processing at the PHY Layer

FIG. 4 is another flowchart of a data sending method according to this application.

310: A physical layer of a transmitting end obtains a position mapping relationship between N sub-PDUs included in a MAC PDU carried by a first TB and data parts of a plurality of CBs obtained by dividing a second TB, where each of the plurality of CBs obtained by dividing the second TB includes header information and a data part. The last CB in the plurality of CBs further includes a CRC code of the second TB.

Specifically, the plurality of CBs may be obtained by dividing the second TB plus the CRC code of the second TB.

For example, a first CB is any one of the plurality of CBs. For description of header information of the first CB, refer to the description of the header information in operation 210. Details are not described herein again.

320: The physical layer of the transmitting end generates the second TB based on the position mapping relationship and the first TB.

The plurality of CBs obtained by dividing the second TB include the first CB, and the header information of the first CB indicates a position correspondence between a data part in the first CB and M sub-PDUs in the N sub-PDUs included in the MAC PDU.

In some embodiments, in operation 320, there may be different embodiments in which the physical layer generates the second TB based on the first TB.

One TB is used to carry one MAC PDU, and a size of the TB may be determined by a quantity of physical resources allocated to the TB and a modulation and coding scheme (MCS). In this case, the size of the TB may be referred to as a theoretical size of the TB, and the TB may also be referred to as a theoretical TB.

For example, in an embodiment, the first TB may be a theoretical TB, and the second TB is an actual TB obtained after header information is added to each of a plurality of CBs obtained by dividing the theoretical TB. In other words, the second TB is obtained by adding a total length of header information of the plurality of CBs obtained by dividing the first TB to the size of the first TB.

Figure 5:
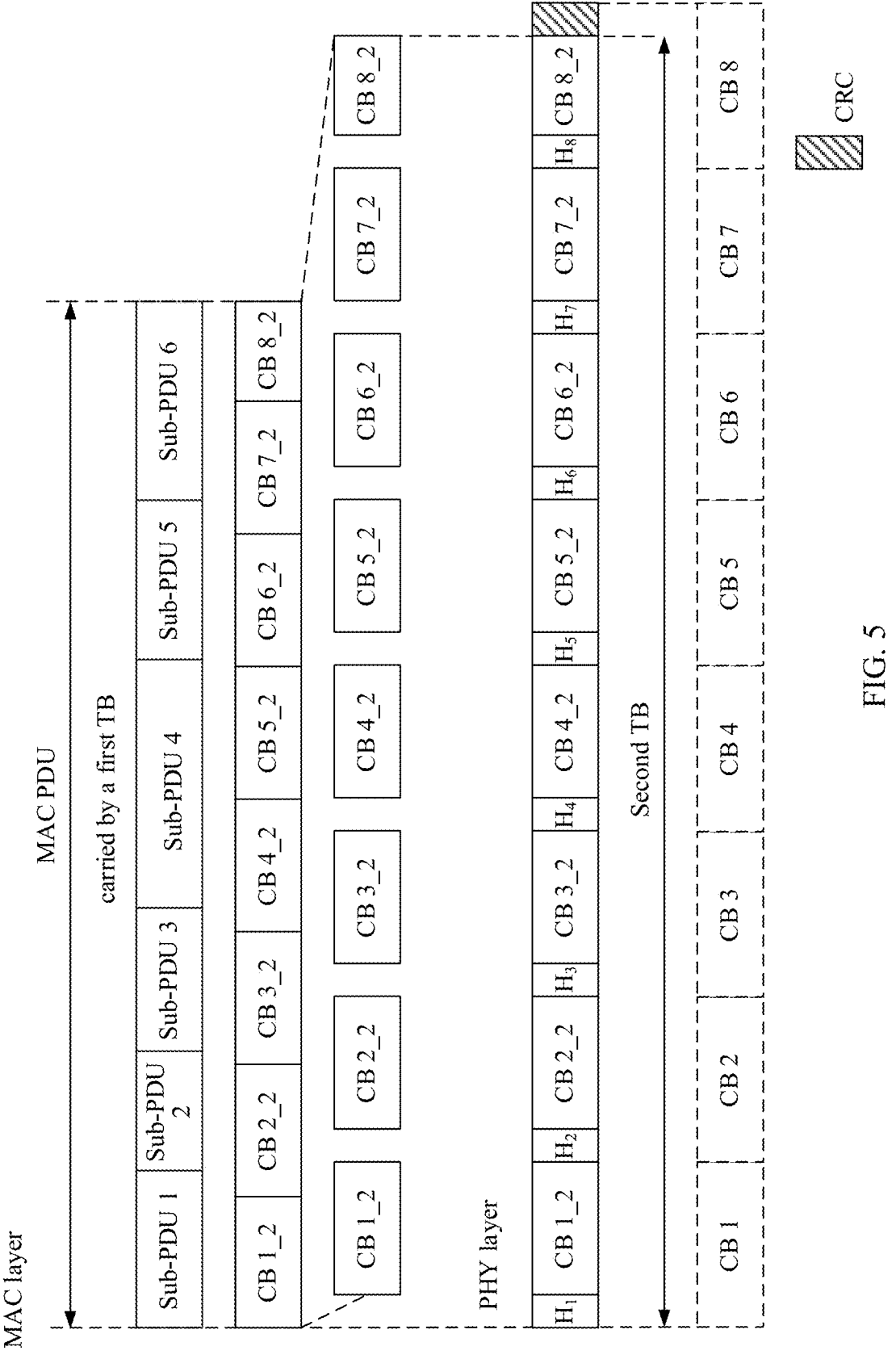
FIG. 5 is a diagram of a processing process of a transmitting end.

The following provides descriptions with reference to FIG. 5.

FIG. 5 is a diagram of a processing process of the transmitting end. As shown in FIG. 5, the MAC PDU carried by the first TB includes six sub-PDUs, which are respectively denoted as sub-PDUs 1 to 6. After obtaining information about the MAC PDU carried by the first TB, the physical layer determines, with reference to information about the second TB, a position mapping relationship between the MAC PDU and data parts of eight CBs obtained by dividing the second TB. The eight CBs obtained by dividing the second TB each include a data part and header information of a fixed length and format, and the last CB in the eight CBs further includes a CRC code of the second TB. The header information of each of the eight CBs may be denoted as CB i_1, and the data part thereof is denoted as CB i_2, where i=1, 2, 3, . . . , 8. Header information of CB i may also be directly denoted as $H_i$, for example, $H_1$ or $H_2$. Further, the physical layer generates the second TB based on sub-PDU 1 to sub-PDU 6 and the position mapping relationship. The header information of each of the eight CBs obtained by dividing the second TB indicates a position correspondence between the data part of the CB and M sub-PDUs in the six sub-PDUs, or the header information indicates a position of the data part of the CB in the MAC PDU. For example, the header information of CB 1 indicates a position correspondence between sub-PDU 1 and the data part (that is, CB 1_2) of CB 1. The header information of CB 2 indicates a position correspondence (specifically, a partial correspondence) between the data part (that is, CB 2_2) of CB 2 and sub-PDU 1 and sub-PDU 2. The header information of CB 3 indicates a position correspondence (specifically, a partial correspondence) between the data part (that is, CB 3_2) of CB 3 and sub-PDU 2 and sub-PDU 3; and so on.

According to the foregoing description in operation 210 that the data part of the CB corresponds to a part or all of the M sub-PDUs in the N sub-PDUs included in the MAC PDU, a position correspondence between a data part of each CB and sub-PDU 1 to sub-PDU 6 in FIG. 5 may be learned.

For example, the data part of CB 1 corresponds to a part of a sub-PDU in sub-PDU 1 to sub-PDU 6, and the sub-PDU is sub-PDU 1 in sub-PDU 1 to sub-PDU 6.

For another example, the data part of CB 2 corresponds to parts of two sub-PDUs in sub-PDU 1 to sub-PDU 6, and the two sub-PDUs are sub-PDU 1 and sub-PDU 2 in sub-PDU 1 to sub-PDU 6.

For another example, the data part of CB 3 corresponds to parts of two sub-PDUs in sub-PDU 1 to sub-PDU 6, and the two sub-PDUs are sub-PDU 2 and sub-PDU 3 in sub-PDU 1 to sub-PDU 6.

Alternatively, in FIG. 5, the position mapping relationship between the N sub-PDUs included in the MAC PDU carried by the first TB and the data parts of the plurality of CBs obtained by dividing the second TB may be understood as a position mapping relationship between the N sub-PDUs and the plurality of CBs included in the first TB.

It can be learned from FIG. 5 that a length of the second TB is greater than a length of the first TB.

For example, in another embodiment, the first TB may be an equivalent TB, and the second TB is a theoretical TB.

Figure 6:
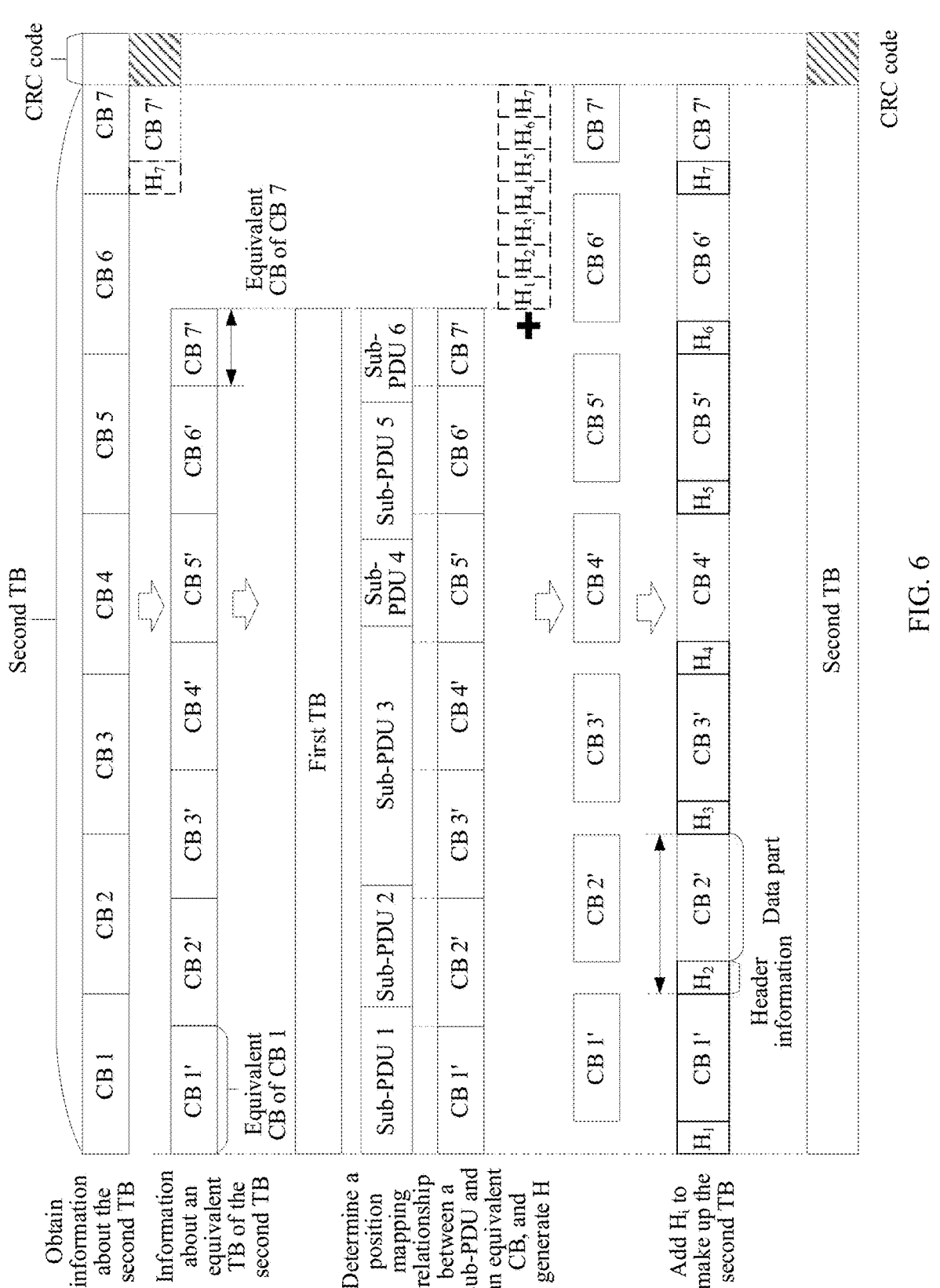
FIG. 6 is another diagram of a processing process of a transmitting end.

The following provides descriptions with reference to FIG. 6.

FIG. 6 is another diagram of a processing process of the transmitting end. As shown in FIG. 6, the physical layer of the transmitting end obtains information about the theoretical TB (the second TB shown in FIG. 6). The information about the theoretical TB includes a size of the theoretical TB, and a quantity and sizes of CBs (referred to as theoretical CBs below for ease of description) obtained by dividing the theoretical TB. It should be understood that the sizes of the theoretical CBs are obtained by dividing CBs after a CRC code of a length (for example, 16 bits or 24 bits) is added to the end of the theoretical TB. For an example of the theoretical CBs, refer to CB 1 to CB 7 in FIG. 6. The physical layer determines information about the equivalent TB (the first TB shown in FIG. 6) based on the size of the theoretical TB. The information about the equivalent TB includes a size of the equivalent TB, a quantity of CBs (referred to as equivalent CBs) included in the equivalent TB, and a size of each equivalent CB. For an example of equivalent CBs, refer to CB 1' to CB 7' in FIG. 6. It may be understood that the length of the equivalent TB is equal to a sum of sizes of data parts of the theoretical CBs included in the theoretical TB. The respective equivalent CBs of CB 1 to CB 6 are obtained by subtracting a length of header information from the theoretical CB. For example, the equivalent CB of CB 1 is obtained by subtracting header information from CB 1. The equivalent CB of CB 7 is obtained by subtracting a length of header information and a length of the CRC code of the second TB from the size of CB 7. The physical layer determines a position mapping relationship between N sub-PDUs included in a MAC PDU carried by the equivalent TB and the plurality of equivalent CBs included in the equivalent TB, and generates header information of each equivalent CB. Alternatively, the position mapping relationship between the N sub-PDUs and the plurality of equivalent CBs may also be understood as a position mapping relationship between the N sub-PDUs included in the MAC PDU carried by the equivalent TB and the data parts of the plurality of theoretical CBs. The physical layer adds the header information to each equivalent CB to form the theoretical TB. As shown in FIG. 6, the MAC PDU carried by the first TB includes six sub-PDUs, which are respectively denoted as sub-PDUs 1 to 6. Seven CBs (namely, theoretical CBs) are obtained by dividing the second TB plus the CRC code, and are respectively denoted as CB 1 to CB 7. The first TB is an equivalent TB of the second TB, and the first TB includes equivalent CBs respectively corresponding to CB 1 to CB 7, which are respectively denoted as CB 1' to CB 7'. The physical layer determines a position mapping relationship between sub-PDUs 1 to 6 and CB 1' to CB 7', and generates and adds header information H of each equivalent CB, to obtain the second TB.

Alternatively, in FIG. 6, an equivalent CB is a data part of a theoretical CB corresponding to the equivalent CB.

330: The physical layer of the transmitting end adds the CRC code to the end of the second TB.

340: The physical layer of the transmitting end sends the second TB and the CRC code.

It can be learned that, in the method 300, the length of the TB finally sent by the physical layer of the transmitting end is the length of the theoretical TB, but a total length of the MAC PDU carried by the theoretical TB is reduced, and is equal to a size of the MAC PDU carried by the equivalent TB of the theoretical TB.

In some embodiments, in the method 200 or the method 300, the physical layer of the transmitting end may further add a CRC code to a CB (including header information and a data part) after operation 340, and send the CB and the CRC code. This is not limited.

In the foregoing embodiments, one of the N sub-PDUs included in the MAC PDU may correspond to a part or all of one or more data packets related to network coding (network coding, NC). In other words, in the foregoing embodiment, a sub-PDU may correspond to an NC-related data packet, the NC-related data packet is not limited to an original data packet or a coded data packet, and the sub-PDU may completely correspond to a size of the NC-related data packet, or may partially correspond to the size of the NC-related data packet. The original data packet refers to a data packet that has not undergone a network coding operation. The coded data packet is a data packet generated after network coding is performed on an original data packet, and may also be referred to as an NC data packet. A size of the coded data packet may be equal to a size of the original data packet, or the size of the coded data packet is greater than the size of the original data packet. The network coding operation may include performing network coding on the original data packet and adding a header of the coded data packet, and may further include segmenting and/or concatenating the original data packet before network coding. The solution of this application may support equal sizes (equal division) of original data packets for network coding, or may support unequal sizes of original data packets for network coding (that is, not performing segmentation and concatenation or partial segmentation).

For example, the transmitting end may introduce an NC function sublayer, and the function sublayer is used to implement a complete network coding function. The function sublayer may be located between a packet data convergence protocol (PDCP) layer and a radio link control (RLC) layer, may be located between the RLC layer and a MAC layer, or may be located between the MAC layer and the PHY layer.

Alternatively, the NC function may be embedded into a layer. In this case, the corresponding embedded layer may be referred to as an NC function sublayer. For example, the NC function is embedded into one or more of a backhaul adaptation protocol (BAP) layer, the PDCP layer, the RLC layer, or the MAC layer. The NC function sublayer may perform network coding on a PDU at a protocol layer, or perform network coding on an SDU. When the NC function is located at the PDCP layer, the NC function may be located between a header compression function and an integrity protection function, or may be located after an encryption function and before PDCP header adding.

When the NC function sublayer is considered, with reference to a scenario, the NC function sublayer may be on a central unit (CU) side of a gNB, or may be on a distributed unit (DU) side of the gNB.

It can be learned from the foregoing description that each CB includes header information and a data part. The following describes several design solutions of header information of a CB provided in this application.

Figure 7:
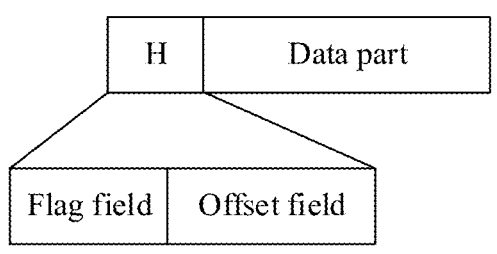
FIG. 7 is a design solution of header information.

FIG. 7 is a design solution of header information.

As shown in FIG. 7, the CB includes header information and a data part. The header information may include a flag field and an offset field, and the flag field has a first value and a second value. The first value indicates that the CB includes a start bit (that is, a start position) of a sub-PDU, and the second value indicates that the CB does not include a start bit of a sub-PDU.

For example, the flag field may include 1 bit, the first value is "1", and the second value is "0".

Specifically, when the flag field is the first value, the offset field included in the header information of the CB indicates an offset, relative to a start position of the data part of the CB, of a start position of a sub-PDU that is in one or more sub-PDUs whose start positions fall within the CB and that is closest to a start position of the CB.

When the flag field is the second value, the offset field included in the header information of the CB is an invalid field. The invalid field may not be parsed by a receiving end.

The offset field may alternatively be an invalid value. For example, the invalid value may be a reserved value of the offset field, for example, an all-1 sequence of the offset field.

It may be understood that if a data part of a CB corresponds to a part of one of the N sub-PDUs, and the part of the sub-PDU does not include a start position of the sub-PDU, the CB does not include the start position of the sub-PDU. If a data part of a CB corresponds to M sub-PDUs in the N sub-PDUs, header information of the CB includes a start position of at least one sub-PDU. Further, when a CB includes a start position of a sub-PDU, whether the CB includes a complete sub-header of the sub-PDU may be determined by determining a size of data of the sub-PDU that is not included in the CB.

FIG. 3 is used as an example. For example, the data part of CB 8 corresponds to a part of sub-PDU 6. In this case, a flag field of the header information of CB 8 should be the second value, indicating that the data part of CB 8 does not include a start position of the sub-PDU. In this case, an offset field may be an invalid field. The invalid field may not be parsed by the receiving end. The offset field may alternatively be an invalid value.

For another example, the data part of CB 2 corresponds to a part of sub-PDU 1 and a part that is of sub-PDU 2 and that includes a start position. In this case, a flag field of the header information of CB 2 should be the first value, indicating that the data part of CB 2 includes a start position of a sub-PDU. In this case, an offset field may indicate a position of the start position of sub-PDU 2 in the data part of CB 2. For example, the offset field indicates an offset of the start position of sub-PDU 2 relative to a start position of the data part of CB 2.

Figure 8:
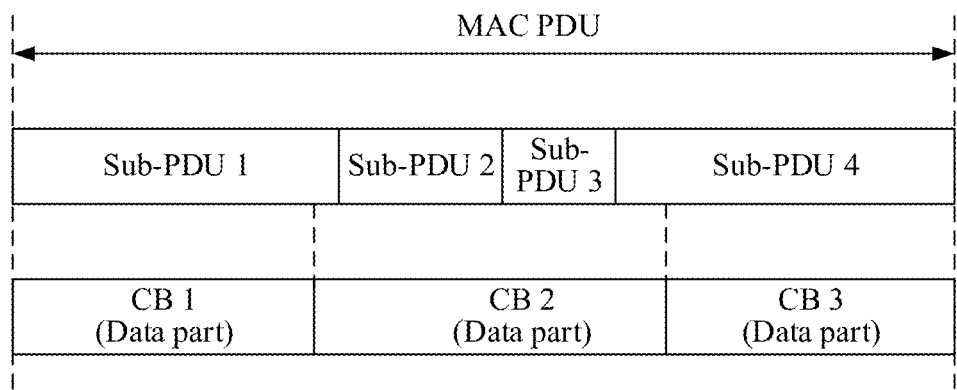
FIG. 8 is an example of a position mapping relationship between CBs and sub-PDUs.

When a data part of a CB corresponds to M sub-PDUs, and start positions of at least two sub-PDUs in the M sub-PDUs fall within the data part of the CB, a flag field of header information of the CB indicates an offset of a start position of the first sub-PDU in the at least two sub-PDUs relative to a start position of the CB, as shown in FIG. 8.

FIG. 8 is an example of a position mapping relationship between CBs and sub-PDUs. As shown in the figure, a MAC PDU includes four sub-PDUs, which are denoted as sub-PDU 1 to sub-PDU 4. ATB carrying the MAC PDU includes three CBs: CB 1 to CB 3. CB 2 corresponds to sub-PDU 1, sub-PDU 2, sub-PDU 3, and sub-PDU 4. A data part of CB 2 includes start positions of sub-PDU 2, sub-PDU 3, and sub-PDU 4. In this case, header information of CB 2 includes a flag field and an offset field. The flag field indicates that the data part of CB 2 includes a start position (that is, a start bit) of a sub-PDU, and the offset field indicates an offset, relative to a start position of CB 2, of a start position of a sub-PDU that is in the sub-PDUs whose start positions fall with the data part of CB 2 and that is closest to the start position of CB 2. Specifically, in sub-PDU 2, sub-PDU 3, and sub-PDU 4, sub-PDU 2 is closest to the start position of CB 2. Therefore, the offset field indicates an offset of a start position of sub-PDU 2 relative to the start position of the data part of CB 2.

For the receiving end, when CRC on a CB (including header information and a data part) succeeds, the receiving end may obtain a correspondence between the CB and a sub-PDU by parsing the header information of a fixed length and format.

In another embodiment, the header information of the CB includes an offset field, and the offset field has a valid value and an invalid value.

When the offset field is the valid value, the valid value indicates that the first CB includes a start position of a sub-PDU, and the valid value indicates an offset, relative to a start position of the data part of the first CB, of a start position of a sub-PDU that is in the sub-PDUs whose start positions fall within the first CB and that is closest to the start position of the first CB.

When the offset field is the invalid value, the invalid value indicates that the first CB does not include a start position of a sub-PDU, and the invalid value indicates an invalid offset.

In some embodiments, there may be one or more invalid values. This is not limited. In addition, different offsets should correspond to different valid values.

For example, a reserved value of the offset field is used as an invalid value of the offset field, and a value other than the reserved value is used as a valid value. For example, a special sequence of the reserved value of the offset field is defined to indicate whether the CB includes a start position of a sub-PDU. For example, the offset field uses eight bits, and the special sequence may be an all-1 sequence. When a value of the offset field is the all-1 sequence, the all-1 sequence indicates that the data part of the CB does not include a start position of a sub-PDU. In this case, an offset value indicated by the all-1 sequence is invalid. When the value of the offset field is a value other than the all-1 sequence, the value is a valid value. When the offset field is any valid value, it is considered by default that the data part of the CB includes a start position of a sub-PDU, and an offset of the start position of the first sub-PDU relative to the start position of the data part of the CB can be determined based on the valid value of the offset field. For example, the valid value of the offset field may include an all-0 sequence, indicating that the offset is 0.

Figure 9:
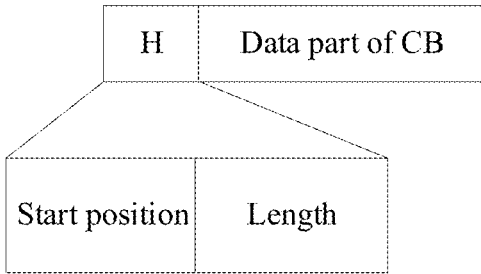
FIG. 9 is another design solution of header information.

For example, in another header information design solution, the header information of the CB includes a start position field and a length field, as shown in FIG. 9.

FIG. 9 is another design solution of header information. For example, the header information may include the following fields.

A start position field indicates a position of a start position of a data part of a CB in a corresponding sub-PDU, and may indicate a length (that is, a size) between the position of the start position of the data part of the CB in the corresponding sub-PDU and a start position of the sub-PDU.

A length field indicates a length of the sub-PDU in which the start position of the data part of the CB is located.

In some embodiments, neither of the lengths indicated by the start position field and the length field limits the unit of length. For example, the unit of these lengths may be a quantity of bits, a quantity of bytes, or the like. In the following embodiments, that a quantity of bits is used as the unit of length is merely used as an example for description.

For example, in FIG. 8, header information of CB 2 includes a start position field and a length field. The start position field indicates a position of a start position of a data part of CB 2 in sub-PDU 1, and may indicate a quantity of bits (or a quantity of bytes) included between a start position of sub-PDU 1 and the position of the start position of the data part of CB 2 in the corresponding sub-PDU 1. In addition, because the length field indicates a length of sub-PDU 1, an end position of sub-PDU 1 and a position of the end position in CB 2 can be learned, and a position of a start position of sub-PDU 2 in CB 2 can be learned.

The foregoing two fields may also be changed into one field, that is, a start position field, but the start position field has a different meaning. The start position field indicates a position of a start position of a data part of a CB in a corresponding sub-PDU, and indicates a length (for example, a quantity of bits or a quantity of bytes) between the position of the start position of the data part of the CB in the corresponding sub-PDU and an end position of the sub-PDU. FIG. 8 is used as an example. The start field of the header information of CB 2 indicates a length (for example, a quantity of bits or a quantity of bytes) between a position of the start position of the data part of CB 2 in the corresponding sub-PDU 1 and an end position of sub-PDU 1, and a position of a start position of sub-PDU 2 in CB 2 is equivalently obtained.

Figure 10:
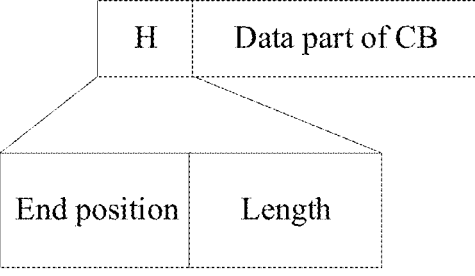
FIG. 10 is still another design solution of header information.

FIG. 10 is still another design solution of header information. For example, the header information may include the following fields.

An end position (End POS) field indicates a position of an end position of a data part of a CB in a corresponding sub-PDU, and may indicate a length between the position of the end position of the data part of the CB in the corresponding sub-PDU and a start position of the sub-PDU.

A length field indicates a length of a sub-PDU in which an end position of a data part of a CB is located.

For example, in FIG. 8, the header information of CB 1 includes an end position field and a length field. The end position field indicates a quantity of bits (or a quantity of bytes) included between a position of an end position of the data part of CB 1 in sub-PDU 1 and a start position of sub-PDU 1. Because the length field indicates the length of sub-PDU 1, a quantity of bits (or a quantity of bytes) included in sub-PDU 1 in the data part of CB 2 can be learned, and a position of a start position of sub-PDU 2 in CB 2 is indirectly indicated.

The foregoing two fields may also be changed into one end position (End POS) field, indicating a position of an end position of a data part of a CB in a corresponding sub-PDU, and may indicate a remaining length of the sub-PDU corresponding to the end position of the data part of the CB. The remaining length is a length from the position of the end position of the data part of the CB in the corresponding sub-PDU to the end position of the sub-PDU. As shown in FIG. 8, a length (for example, a quantity of bits or a quantity of bytes) between a position of the end position of the data part of CB 1 in sub-PDU 1 and the end position of sub-PDU 1 is known, so that a quantity of bits (or a quantity of bytes) of sub-PDU 1 in the data part of CB 2 is learned, that is, a position of the start position of sub-PDU 2 in the data part of CB 2 is obtained.

It should be understood that, when there is a position correspondence between a data part of one CB (for example, CB 1) and M sub-PDUs, and a last part of the last sub-PDU in the M sub-PDUs falls into a next CB (for example, CB 2) after the CB, a position of sub-PDU (m+1) in CB 2 may be indicated by using a quantity of remaining bits of the last sub-PDU (for example, sub-PDU m) in the M sub-PDUs corresponding to CB 1. Sub-PDU (m+1) represents a next sub-PDU after sub-PDU m, and m is a positive integer.

CB 1 in FIG. 8 is used as an example. There is a position mapping relationship between the data part of CB 1 and sub-PDU 1, and a last part of sub-PDU 1 falls into CB 2 after CB 1. The header information of CB 1 includes an end position field and a length field. The end position field indicates a position of the end position of the data part of CB 1 in sub-PDU 1, and may indicate a quantity of remaining bits of sub-PDU 1. Therefore, a position of the start position of sub-PDU 2 in the data part of CB 2 can be obtained.

Particularly, for the design of the header information shown in FIG. 10, a receiving end receives a TB from a transmitting end for CRC. When the TB is incorrect, a position of each CB is obtained according to a rule of dividing the TB into CBs. With reference to a CRC check result of each CB, for a correct CB, an end position field and a length field in header information of a fixed format of the CB are parsed, to obtain a position mapping relationship between a data part in a next CB and a corresponding sub-PDU. In addition, if one or more following CBs including complete sub-PDUs are correct, correct and complete sub-PDUs may be obtained and transmitted to an upper layer.

FIG. 8 is used as an example. It is assumed that CB 1 and CB 2 are correct, and CB 3 is incorrect. The data part of CB 1 corresponds to a start position of sub-PDU 1. A position mapping relationship between sub-PDU 2 and the data part of CB 2 may be obtained by parsing the header information of CB 1. Because CB 1 is correct, a start position of sub-PDU 2 in the data part of CB 2 is obtained, and a size of sub-PDU 2 may be obtained based on a sub-header of sub-PDU 2, and then a size of sub-PDU 3 is obtained. In addition, sub-PDU 1 corresponds to a part of CB 1 and CB 2. In this case, it can be learned that sub-PDU 1 to sub-PDU 3 are correct. A position mapping relationship between CB 3 and sub-PDU 4 may be obtained by parsing a header of CB 2, and it is learned that a data part of CB 3 is a part of sub-PDU 4. Because CB 3 is incorrect, sub-PDU 4 is incorrect. An incorrect TB may be parsed according to the foregoing procedure, so as to obtain a correct sub-PDU and deliver the correct sub-PDU to an upper layer.

The foregoing describes a data processing process of the transmitting end, and the following describes a data delivery solution of the receiving end provided in this application.

FIG. 11 is a procedure of receiving data by a receiving end according to this application. As shown in FIG. 11, the method 400 may be performed by a receiving end, or may be performed by an apparatus (for example, a chip or a chip system) having a corresponding function of the receiving end. This is not limited. The following uses the receiving end as an example for description.

410: The receiving end receives a TB from a transmitting end, where there is a position mapping relationship between data parts in a plurality of CBs obtained by dividing the TB and N sub-PDUs included in a MAC PDU.

Each of the plurality of CBs includes header information and a data part. The plurality of CBs include a first CB, header information of the first CB indicates a position of a data part of the first CB in the MAC PDU, or the header information of the first CB indicates a position correspondence between the data part of the first CB and M sub-PDUs in the N sub-PDUs, both N and M are integers, and M is less than or equal to N.

420: The receiving end obtains one or more complete sub-PDUs of the MAC PDU based on the position mapping relationship.

Specifically, the receiving end receives the TB from the transmitting end, and first performs CRC on the TB. If the CRC on the TB succeeds, the receiving end obtains a data part of the TB. If the CRC on the TB fails, the receiving end performs, by using a CB as a granularity, CRC on the plurality of CBs obtained by dividing the TB. By performing CRC by using a CB as a granularity, the receiving end obtains a correct CB (that is, a CB on which CRC succeeds) in the plurality of CBs. There may be one or more correct CBs. One correct CB is used as an example. The receiving end parses header information of a fixed length and format of the correct CB, to obtain a position correspondence between a data part of the correct CB and M sub-PDUs in the N sub-PDUs included in the MAC PDU.

Alternatively, a CB that succeeds in CRC is a correct CB, and a CB that fails in CRC is an incorrect CB.

Compared with the foregoing position mapping relationship between the plurality of CBs included in the TB and the N sub-PDUs included in the MAC PDU, a position mapping relationship between a correct CB and a sub-PDU corresponding to the correct CB is referred to as a local position mapping relationship in this specification. Alternatively, the local position mapping relationship may also be referred to as a partial position mapping relationship. This is not limited.

After obtaining the local position mapping relationship, the receiving end obtains a complete sub-PDU in one or more correct CBs based on the local position mapping relationship.

For example, the receiving end may have the following different processing processes.

In a possible embodiment, after receiving the TB from the transmitting end, a physical layer of the receiving end first performs CRC on the TB. After it is determined that the CRC on the TB fails, the physical layer performs, one by one by using a CB as a granularity, CRC on the plurality of CBs obtained by dividing the TB, to obtain a correct CB. Further, the physical layer parses header information of a fixed length and format of each correct CB to obtain a position mapping relationship between a data part of the correct CB and M sub-PDUs in the N sub-PDUs included in the MAC PDU, and then obtains a complete sub-PDU in the correct CB based on the position mapping relationship. The physical layer delivers the complete sub-PDU obtained from the correct CB to a MAC layer. There may be one or more correct CBs, and there may be one or more complete sub-PDUs.

In another possible embodiment, after receiving a TB from the transmitting end, the physical layer of the receiving end first performs CRC on the TB. After determining that the CRC on the TB fails, the physical layer performs, one by one by using a CB as a granularity, CRC on a plurality of CBs obtained by dividing the TB, to obtain CRC results of the plurality of CBs, that is, determines whether CRC on the plurality of CBs succeeds. Further, the physical layer delivers the TB and the CRC results to the MAC layer. The MAC layer parses header information of a fixed length and format of a correct CB based on the CRC result, to obtain a position mapping relationship between a data part of the correct CB and N sub-PDUs included in a MAC PDU, and obtains one or more complete sub-PDUs from the correct CB.

In yet another possible embodiment, after receiving a TB from the transmitting end, the physical layer of the receiving end performs CRC on the TB. After determining that the CRC on the TB fails, the physical layer performs, one by one by using a CB as a granularity, CRC on a plurality of CBs obtained by dividing the TB, to obtain a correct CB in the plurality of CBs. The physical layer delivers the correct CB to the MAC layer. Further, the MAC layer parses header information of a fixed length and format of the correct CB to obtain one or more complete sub-PDUs. The MAC layer may deliver the one or more complete sub-PDUs to an upper layer.

The foregoing describes a solution in which the transmitting end adds header information to indicate the position mapping relationship between the data parts of the plurality of CBs obtained by dividing the TB and the N sub-PDUs included in the MAC PDU, so that the receiving end obtains the position mapping relationship between the data parts of the CBs and the sub-PDUs by parsing the header information, so as to deliver a complete sub-PDU in the CB that succeeds in CRC (that is, a correct CB) to an upper layer.

In addition, this application further provides some other data delivery solutions that can improve performance of a communication system, for example, the following solution 1 and solution 2.

Solution 1

Solution 1 is independent of the foregoing embodiments of adding header information, and may be used independently, so that performance of a communication system can be improved, for example, a system throughput is improved, and a latency is reduced.

In solution 1, because structures of MAC PDUs in LTE and NR are different, embodiments of the solution are also slightly different. Therefore, descriptions are provided separately.

(1) Application of Solution 1 in LTE

In LTE, a MAC PDU includes a MAC header and a MAC CE or MAC SDU following the MAC header. The MAC header aggregates information about all sub-headers (that is, MAC sub-headers), and each sub-header corresponds to one MAC CE or MAC SDU. The information about the sub-header includes a field L used to indicate a length of a MAC CE or a MAC SDU.

A structure of a MAC PDU in LTE is different from the solution in which the transmitting end adds header information to a CB (or a CBG) in the foregoing embodiment, and the transmitting end does not change. When a TB is incorrect, the receiving end performs CRC determining by using a CB as a granularity. When CRC on a CB corresponding to the MAC header succeeds, the receiving end obtains each sub-header from the MAC header, and obtains a MAC CE or a MAC SDU in the correct CB based on an indication of each sub-header.

The following describes two embodiments of the data delivery solution of the receiving end. One embodiment may be shown in FIG. 12, and the other embodiment is shown in FIG. 14.

FIG. 12 is a diagram of a data delivery solution of a receiving end according to this application.

501: A PHY layer of the receiving end receives a TB.

502: The PHY layer determines whether CRC on the TB succeeds.

In a possible case, if the CRC on the TB succeeds, the PHY layer delivers the entire TB to a MAC layer, that is, delivers all sub-PDUs in the TB to the MAC layer, as shown in operation 503 in the figure.

In another possible case, if the CRC on the TB fails, the PHY layer performs, by using a CB as a granularity, CRC on a plurality of CBs obtained by dividing the TB, and operation 504 is performed.

504: The PHY layer determines whether CRC on a CB corresponding to a MAC header succeeds.

Herein, there may be one or more CBs corresponding to the MAC header.

In addition, the MAC header is in a fixed format, and has different lengths when including different fields, and the PHY layer knows the length of the MAC header. In this way, the PHY layer may learn which CB or CBs are corresponding to the MAC header.

If the CRC on the CB corresponding to the MAC header fails, the receiving end cannot obtain information about each sub-header included in the MAC header, and therefore cannot identify the MAC CE or MAC SDU in the TB, as shown in operation 505 in the figure.

If the CRC on the CB corresponding to the MAC header succeeds, it indicates that the MAC header is correct, and the receiving end performs subsequent operations 506 and 507.

506: The PHY layer parses the MAC header to obtain sub-headers of all MAC CEs and/or MAC SDUs, so as to determine sizes of all the MAC CEs and/or MAC SDUs based on the sub-headers. The MAC header includes sub-headers of all MAC CEs and/or MAC SDUs. Further, with reference to a policy of dividing a TB into CBs that is known by the PHY layer, the PHY layer may determine a position mapping relationship between respective data parts of the plurality of CBs obtained by dividing the TB and all MAC CEs or MAC SDUs. In addition, the PHY layer performs, by using a CB as a granularity, CRC on the plurality of CBs obtained by dividing the TB, to obtain a correct CB in the plurality of CBs. Further, the PHY layer obtains a complete MAC CE or a complete MAC SDU from the correct CB based on the position mapping relationship.

507: The PHY layer delivers one or more of the complete MAC header and MAC CE or MAC SDU to the MAC layer.

The following describes the data delivery solution in FIG. 12 by using an example with reference to FIG. 13.

FIG. 13 is an example of a data delivery solution of a receiving end according to this application. As shown in FIG. 13, the receiving end performs CRC on CB 1 to CB 7 obtained by dividing a TB, to determine correct CBs in CB 1 to CB 7. It is assumed that CB 1 to CB 3, CB 5, and CB 6 are correct. The MAC header corresponds to CB 1 and a part of CB 2. Therefore, if CRC on CB 1 and CB 2 succeeds, integrity and correctness of the MAC header can be ensured. By parsing the MAC header, the receiving end obtains information about each sub-header, including information about a size of a MAC CE or a MAC SDU corresponding to each sub-header and information about a length of a padding bit. Therefore, the receiving end may determine a position mapping relationship between data parts of CB 1 to CB 7 and MAC CE 1, MAC CE 2, and MAC SDU 1 to MAC SDU 4, and a position and length of the padding bit. Based on the position mapping relationship, the PHY layer of the receiving end may obtain complete MAC CEs or MAC SDUs in CB 1 to CB 3, CB 5, and CB 6, and deliver the complete MAC CEs or MAC SDUs to the MAC layer. The PHY layer may discard the padding bit without processing. Specifically, if CRC on CB 1 to CB 3 succeeds, it can be ensured that MAC CE 1 and MAC CE 2 are correct, and if CRC on CB 5 and CB 6 succeeds, it can be ensured that MAC SDU 2 and MAC SDU 3 are correct. The PHY layer delivers the MAC header, MAC CE 1, MAC CE 2, MAC SDU 2, and MAC SDU 3 to the MAC layer.

In another embodiment, when the PHY layer of the receiving end determines that the TB is incorrect, the PHY layer may deliver the incorrect TB and CRC results of the CBs to the MAC layer. The MAC layer identifies one or more of a correct and complete MAC header and MAC CE or MAC SDU, and delivers the correct and complete MAC header and MAC CE or MAC SDU to an upper layer, as shown in a procedure in FIG. 14.

FIG. 14 is a diagram of another data delivery solution of a receiving end according to this application.

601: A PHY layer of the receiving end receives a TB from a transmitting end.

602: The PHY layer determines whether CRC on the TB succeeds.

If the CRC on the TB succeeds, operation 603 is performed. If the CRC on the TB fails, operations 604 to 606 are performed.

603: The PHY layer delivers the entire TB to a MAC layer.

604: The PHY layer delivers, to the MAC layer, the incorrect TB and a CRC result of each CB included in the TB.

605: The MAC layer parses the incorrect TB, and identifies a correct and complete MAC CE and/or MAC SDU.

Specifically, because a MAC header is in a fixed format, the MAC layer knows a length of the MAC header. Therefore, the MAC layer can learn of a CB corresponding to the MAC header, and perform CRC on the CB corresponding to the MAC header. The MAC layer determines whether the MAC header is correct based on a CRC result of the CB corresponding to the MAC header. If the CRC on the CB corresponding to the MAC header fails, the MAC layer cannot obtain information about each sub-header included in the MAC header, and therefore cannot identify the MAC CE or the MAC SDU in the TB.

If the CRC on the CB corresponding to the MAC header succeeds, it indicates that the MAC header is correct. The MAC layer identifies, based on the information about each sub-header included in the MAC header, a complete MAC CE or MAC SDU from the correct CB (that is, the CB that succeeds in CRC).

606: The MAC layer delivers the correct and complete MAC header and MAC CE or MAC SDU to an upper layer.

(2) Application of Solution 1 in NR

Different from the structure of the MAC PDU in LTE, one MAC PDU in NR includes several MAC sub-PDUs (or sub-PDUs for short), and each sub-PDU includes a sub-header and a data part (including a MAC CE or a MAC SDU). In other words, each sub-header corresponds to one sub-PDU. A sub-header includes a field used to indicate a length of a sub-PDU corresponding to the sub-header.

For a structure of a MAC PDU in NR, the transmitting end does not change either. When a TB is incorrect, the receiving end performs CRC determining by using a CB as a granularity, until the $1^{st}$ incorrect CB occurs, and CRC is no longer performed on a subsequent CB. For a correct CB before the $1^{st}$ incorrect CB, the receiving end obtains a sub-header of a sub-PDU from the correct CB, and obtains a complete sub-PDU based on an indication of the sub-header, so as to implement data delivery at a sub-PDU granularity.

When solution 1 is applied to NR, a data delivery solution of the receiving end may be as follows:

701: A PHY layer of the receiving end receives a TB.
  702: The PHY layer performs CRC starting from the $1^{st}$ CB included in the TB. For a CB that succeeds in CRC (or a correct CB), the PHY layer obtains a sub-PDU corresponding to a data part of the correct CB. If the obtained sub-PDU is complete, the PHY layer delivers the sub-PDU to a MAC layer until the $1^{st}$ CB that fails CRC (or an incorrect CB) occurs. CRC is no longer performed on a subsequent CB, that is, starting from a sub-PDU corresponding to the $1^{st}$ incorrect CB, all subsequent sub-PDUs cannot be delivered to an upper layer.

Figures 15, 16, 17:
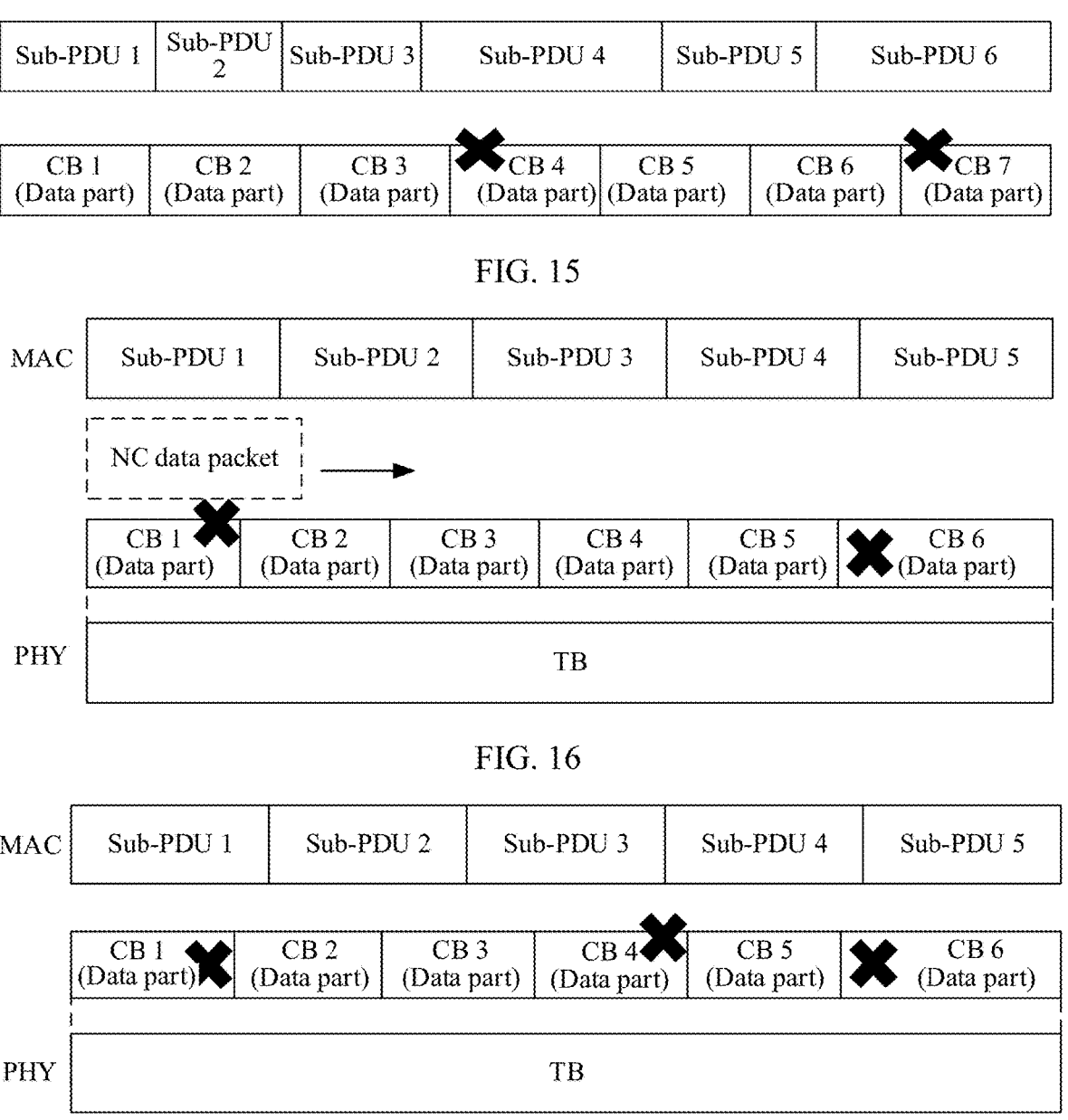
FIG. 15 is an example of a position mapping relationship between CBs and sub-PDUs.
FIG. 16 is an example of another data delivery solution of a receiving end according to this application.
FIG. 17 is an example of a CRC-based blind detection solution of combining header information indications at a receiving end according to this application.

FIG. 15 is an example of a position mapping relationship between CBs and sub-PDUs. As shown in FIG. 15, the $1^{st}$ incorrect CB in CB 1 to CB 7 is CB 4. In this case, a position mapping relationship between CB 4 and CBs (specifically, CB 5 to CB 7) that are located after CB 4 and sub-PDUs cannot be learned of Therefore, the receiving end does not need to perform CRC again. The receiving end parses sub-headers of sub-PDUs in CB 1 to CB 3, and obtains complete sub-PDUs in CB 1 to CB 3 based on the sub-headers, for example, sub-PDU 1 to sub-PDU 3 shown in FIG. 15. In this case, the three complete sub-PDUs may be delivered to an upper layer.

Solution 2

The following further describes a CRC-based blind detection solution, that is, solution 2, which may be used as another data delivery solution of the receiving end. Solution 2 may also be independent of the foregoing embodiments of adding header information, and may be used independently, so as to improve performance of a communication system, for example, improve a system throughput and reduce a latency.

A premise of the blind detection solution is that a CRC part is added to each NC data packet, and sizes of the NC data packets are equal. On this premise, the receiving end performs CRC blind detection on data of a corresponding length (which should be a length of the NC data packet plus a length of the CRC part) based on the size of the NC data packet and a quantity of bits (for example, 24 bits or 18 bits) of the CRC part.

For example, the length of the NC data packet may be semi-statically configured. For ease of description, a sum of the length of the NC data packet and the length of the CRC part is referred to as a first length below.

A procedure of the CRC-based blind detection solution may be as follows:

801: A receiving end receives a TB from a transmitting end.
  802: The receiving end performs CRC on each of a plurality of CBs obtained by dividing the TB, to obtain a correct CB in the plurality of CBs.
  803: For one or more consecutive correct CBs, the receiving end determines whether a length of a data range corresponding to the one or more consecutive correct CBs is equal to or greater than a first length.
  804: If the length of the data range is equal to or greater than the first length, the receiving end reads, starting from the first bit of the data range (that is, from a start position of the $1^{st}$ CB in the one or more consecutive correct CBs), a data segment of the first length to perform CRC. If CRC on the data segment of the first length succeeds, data of the data segment is obtained. A data segment of the first length continues to be read starting from a next bit of the last bit of the data segment, and CRC is performed. If the CRC on the data segment of the first length fails, shifting is performed backwards by one bit from the start position of the $1^{st}$ CB, to continue to read another data segment of the first length for CRC. The rest may be deduced by analogy until a length of remaining data in the data range corresponding to the length of the one or more correct CBs is less than the first length.

In a process of performing CRC, if CRC on a data segment of the first length succeeds, the data segment is delivered to an upper layer.

In some embodiments, the foregoing procedure may be performed by a MAC layer of the receiving end, or may be performed by a PHY layer. This is not limited.

The following describes the CRC-based blind detection solution by using an example with reference to FIG. 16.

FIG. 16 is an example of another data delivery solution of a receiving end according to this application. As shown in FIG. 16, one TB includes CB 1 to CB 6, and there are six CBs in total, where the six CBs include several NC data packets. It is assumed that CRC on CB 1 and CB 6 fails, and CRC on CB 2 to CB 5 succeeds. That is, CRC on four consecutive CBs from a start position of CB 2 to an end position of CB 5 succeeds.

In a data range from the start position of CB 2 to the end position of CB 5, a PHY layer reads, starting from a start bit of CB 2, a data segment of a first length for CRC. If the CRC succeeds, blind detection continues from a next bit at the end of the data segment, that is, a data segment of the first length continues to be read to perform CRC. Alternatively, when sizes of the NC data packets are equal, a position of each NC data packet may be obtained based on the NC data packet that succeeds in CRC, and blind detection is directly performed on the first length corresponding to each NC data packet. If CRC on the data segment of the first length that is read from the start bit of CB 2 fails, CRC continues to be performed by using the first length at a position that is one bit after the start bit of CB 2, and the blind detection solution is performed until the last bit of CB 5 ends. A data segment that succeeds in CRC may be delivered to an upper layer.

In the data range, each time CRC determining is performed, it needs to be determined whether a remaining data length is greater than or equal to the first length. If the remaining data length is less than the first length, the receiving end performs blind detection on a next data range greater than or equal to the first length.

In solution 2, the transmitting end adds a CRC part after an NC data packet of an equal length, so that when a TB is incorrect, the receiving end can perform CRC blind detection on one or more consecutive CBs, and obtain a correct NC data packet from a correct CB, thereby implementing data delivery with an NC data packet as a granularity, and improving fault tolerance performance of a system.

This application further provides a data transmission solution. In this solution, a solution of adding header information of a CB is combined with a CRC-based blind detection solution. The solution of adding header information of a CB may be any one of the solutions of adding header information of a CB in the foregoing embodiments, or may be another solution of adding header information of a CB. This is not limited herein.

In this solution, the transmitting end does not need to add a CRC part to each NC data packet of an equal length as provided in solution 2. Instead, the transmitting end further adds a CRC code to each sub-PDU included in the MAC PDU in addition to adding header information to each CB. Blind detection of the receiving end may be implemented at a PHY layer. The data transmission solution is described as the following method 900, and a procedure may be as follows:

901: A receiving end receives a TB from a transmitting end.

902: If CRC on the TB fails, perform, one by one at a granularity of a CB, CRC on a plurality of CBs obtained by dividing the TB, to obtain a correct CB in the plurality of CBs.

903: For a correct CB, the receiving end parses header information of the CB to obtain position information of a sub-PDU corresponding to a data part in the CB. When a complete sub-header of a sub-PDU is obtained, the sub-header of the sub-PDU is parsed to obtain length information of the sub-PDU.

904: The receiving end performs CRC on the sub-PDU based on the position information and the length information.

905: If the CRC succeeds, it indicates that the sub-PDU is correct, and the PHY layer may deliver the sub-PDU to an upper layer. Otherwise, if the CRC fails, the PHY layer does not deliver the sub-PDU to the upper layer.

In other words, the PHY layer of the receiving end performs CRC at a granularity of a CB, to obtain correctness and error of the plurality of CBs obtained by dividing the TB. The PHY layer parses the header information of the correct CB to obtain a position mapping relationship between the data part in the CB and the sub-PDU. In addition, because the header information of the correct CB includes the complete sub-header of the sub-PDU, the length information of the sub-PDU can be learned by parsing the sub-header of the sub-PDU. The PHY layer performs CRC on bits of a corresponding length based on the position mapping relationship and the length information of the sub-PDU. It should be understood that the bits of the corresponding length are one sub-PDU. If the CRC on the bits of the corresponding length succeeds, the sub-PDU is correct and can be delivered to the upper layer. Otherwise, the sub-PDU is incorrect and is not delivered to the upper layer.

In this solution, when the CRC on the TB fails, the receiving end performs CRC by using a CB as a granularity, to learn of a correct CB. In a possible case, the correct CB includes a first CB, the first CB includes a part of a first sub-PDU, the part of the first sub-PDU includes a start position of the first sub-PDU and a complete sub-header of the first sub-PDU, a remaining part of the first sub-PDU has a position correspondence with a second CB after the first CB, and the second CB is an incorrect CB. The receiving end parses header information of the first CB to obtain a position of the first sub-PDU. In addition, because the header information of the first CB includes the complete sub-header of the first sub-PDU, the receiving end obtains length information of the first sub-PDU by parsing the sub-header of the first sub-PDU. Then, the receiving end reads the complete first sub-PDU based on the position and length information of the first sub-PDU, and performs CRC on the complete first sub-PDU. If the CRC on the complete first sub-PDU is correct, the receiving end obtains the complete first sub-PDU, and may deliver the complete first sub-PDU to an upper layer.

The following provides an example with reference to FIG. 17.

FIG. 17 is an example of a CRC-based blind detection solution of combining header information indications at a receiving end according to this application. As shown in FIG. 17, when CRC on a TB fails, the PHY layer performs CRC by using a CB as a granularity. It is assumed that CB 1, CB 4, and CB 6 are incorrect, and other CBs are correct. Header information of CB 2 indicates a position mapping relationship between a data part of CB 2 and sub-PDU 1 and sub-PDU 2, and the header information of CB 2 further includes a complete sub-header of the sub-PDU. The sub-header of sub-PDU 2 includes length information of sub-PDU 2, length information of a CRC code of sub-PDU 2, and the like. Therefore, the PHY layer obtains the position mapping relationship and the sub-header of sub-PDU 2 by parsing the header information of CB 2. Further, the PHY layer may obtain a position of sub-PDU 2 based on the position mapping relationship. The PHY layer may obtain, based on the sub-header of sub-PDU 2, the length information of sub-PDU 2 and the length information of a CRC code corresponding to sub-PDU 2. The PHY layer performs CRC on sub-PDU 2 and bits of the length of the CRC code corresponding to sub-PDU 2. If the CRC succeeds, it may be determined that sub-PDU 2 is correct, and the PHY layer may deliver sub-PDU 2 to an upper layer. In some embodiments, because the CRC on CB 2 and the CRC on CB 3 both succeed, the PHY layer may not perform CRC on sub-PDU 2, but determines that sub-PDU 2 is correct and delivers sub-PDU 2 to the upper layer. For sub-PDU 3, CB 3 corresponding to sub-PDU 3 is correct, but CB 4 is incorrect. In this case, the PHY layer may obtain a position of the corresponding sub-PDU 3 by parsing header information of CB 3, and then obtain length information of sub-PDU 3 by parsing a sub-header of sub-PDU 3. The PHY layer reads bits of a corresponding length from data parts of CB 3 and CB 4 to perform CRC. If the CRC on the bits of the corresponding length succeeds, it is determined that sub-PDU 3 is correct, and sub-PDU 3 may be delivered to the upper layer.

It can be learned from FIG. 17 that CB 3 is a correct CB, CB 3 corresponds to a part of sub-PDU 3, and the other part of sub-PDU 3 corresponds to CB 4, but CB 4 is an incorrect CB.

In an embodiment, the PHY layer of the receiving end parses the header information of CB 3 to obtain the complete sub-header of sub-PDU 3, where the complete sub-header of sub-PDU 3 includes the length information of sub-PDU 3. The PHY layer reads the complete sub-PDU 3 from CB 3 and CB 4 based on the position and length information of sub-PDU 3, and performs CRC. If the CRC succeeds, it is determined that sub-PDU 3 is correct, and the PHY layer may deliver sub-PDU 3 to the upper layer. In another embodiment, the PHY layer may determine, by using a CRC result of CB 3 that the CRC succeeds and a CRC result of CB 4 that the CRC succeeds, that sub-PDU 3 is correct.

In comparison, in the former embodiment, whether sub-PDU 3 is correct may be determined by using the CRC results of CB 3 and sub-PDU 3, and when CB 3 is correct but CB 4 is incorrect, sub-PDU 3 may still be correct. Therefore, the former embodiment is more robust.

In the data transmission solution described in method 900, the receiving end may accurately obtain the position mapping relationship and the length information of the sub-PDU based on the header information of the CB, and then perform CRC on the sub-PDU to obtain a complete and correct sub-PDU. Compared with solution 2, the data transmission solution has lower complexity, and can more effectively complete detection and delivery of a correct and complete sub-PDU in an incorrect TB, thereby improving performance of a communication system. For example, fault tolerance performance of the system is improved, so that a higher performance gain is obtained in network coding.

In the foregoing embodiment, the transmitting end establishes a position mapping relationship between N sub-PDUs included in a MAC PDU and data parts of a plurality of CBs obtained by dividing a TB plus a CRC code. In another embodiment, the transmitting end may directly establish a position mapping relationship between the N sub-PDUs and the plurality of CBs, that is, establish a position mapping relationship with a sub-PDU by using header information and a data part of a CB as a whole.

In this case, each of the plurality of CBs obtained by dividing the TB plus the CRC code includes header information and a data part, and the last CB in the plurality of CBs includes the CRC code in addition to the header information and the data part. The plurality of CBs include a first CB, and header information of the first CB indicates a position of the first CB in the MAC PDU, or the header information of the first CB indicates a position correspondence between the first CB and M sub-PDUs in the N sub-PDUs, where both N and M are integers, N≥1, M≥1, and M is less than or equal to N.

For example, the header information of the first CB may indicate a position of a start position of the first CB (that is, a start position of the header information of the first CB) in the MAC PDU.

CB 2 in FIG. 3 is used as an example. CB 2_2 includes a part that is of sub-PDU 1 and that does not include a start position, and includes a start bit of sub-PDU 2. In this case, header information of CB 2 may include a flag field and an offset field, and the flag field is a first value, indicating that the data part of CB 2 includes a start position of a sub-PDU. In addition, the offset field indicates an offset of the start position of sub-PDU 2 relative to a start position of the header information of CB 2. Alternatively, in another embodiment, the header information of CB 2 includes an offset field, where the offset field is a valid value, and the valid value indicates that CB 2 includes a start position of a sub-PDU, and further indicates an offset of the start position of sub-PDU 2 relative to the start position of the header information of CB 2.

In the foregoing embodiment, when a TB is incorrect, the receiving end performs CRC by using a CB as a granularity, so as to implement data delivery at a sub-PDU granularity. The following briefly describes a solution in which CRC is performed by using a CBG as a granularity and data is delivered by using a sub-PDU as a granularity.

In this embodiment, a TB is divided to obtain a plurality of CBGs, each CBG includes a first part and a second part, the first part is header information of the CBG, and the second part is a data part of the CBG.

For example, the plurality of CBGs include a first CBG, and header information of the first CBG indicates a position mapping relationship between a data part of the first CBG and M sub-PDUs in N sub-PDUs included in a MAC PDU, where N≥1, M≥1, and M is less than or equal to N. A data part of a CBG is a sum of CBs included in the CBG.

It should be understood that the plurality of CBGs are obtained by dividing the TB plus a CRC code of the TB.

FIG. 18 is an example of a position mapping relationship between CBGs and sub-PDUs according to this application. As shown in FIG. 18, a MAC PDU includes five sub-PDUs, which are denoted as sub-PDU 1 to sub-PDU 5. A TB carrying the MAC PDU is divided into six CBGs: CBG 1 to CBG 6. It can be learned that each of CBG 1 and CBG 2 includes two CBs, and each of the remaining CBGs includes one CB. CBG 1_2 to CBG 6_2 respectively represent data parts of CBG 1 to CBG 6. For example, CBG 1_2 is a sum of CB 1 and CB 2. CBG 2_2 is a sum of CB 3 and CB 4. A data part of CBG 3 is a CB included in CBG 3, and is CB 5. Other CBGs are similar to CBG 3, and details are not described again.

After receiving the TB from the transmitting end, the receiving end performs CRC on the TB. If the TB is incorrect, the receiving end performs CRC on a plurality of CBGs obtained by dividing the TB at a granularity of a CBG, to obtain a correct CBG. Further, the receiving end parses header information in a fixed format and length of a correct CBG, obtains a complete sub-PDU in the correct CBG based on a position mapping relationship between the CBG and a sub-PDU that is indicated in the header information, and delivers the obtained complete sub-PDU to an upper layer, to implement delivery at a sub-PDU granularity, so as to improve fault tolerance performance of a communication system.

FIG. 19 is an example in which a receiving end delivers data based on a position mapping relationship between CBGs and sub-PDUs. As shown in the figure, when a TB is incorrect, a receiving end performs CRC on six CBGs obtained by dividing the TB at a granularity of a CBG, to obtain a correct CBG. It is assumed that CRC on CBG 2 and CRC on CBG 4 fail, and CRC on remaining CBGs succeeds. In this case, CBG 2 and CBG 4 are incorrect CBGs, and the remaining CBGs are correct CBGs. The receiving end parses header information in a fixed format and length of the correct CBG, to obtain a position mapping relationship between a data part of the CBG and a sub-PDU, and obtains a complete sub-PDU from the correct CBG. Specifically, because CBG 1, CBG 3, CBG 5, and CBG 6 are all correct, CBG 1_2 includes a complete sub-header of sub-PDU 1, and CBG 5_2 includes a complete sub-header of sub-PDU 5, the receiving end may obtain complete sub-PDU 1 from CBG 1_2, and obtain complete sub-PDU 5 from CBG 5_2 and CBG 6_2. CBG 3_2 does not include a complete sub-PDU and therefore is invalid. In addition, although CBG 2 is incorrect, CBG 1 is correct. If CBG 1 includes a complete sub-header of sub-PDU 2, header information of CBG 1 is parsed to obtain a complete sub-header of sub-PDU 2, and the complete sub-PDU 2 is read based on an indication of the sub-header of sub-PDU 2. If CRC is also added to the end of sub-PDU 2, whether sub-PDU 2 is correct may be determined based on a CRC check result. Finally, the receiving end may deliver the correct sub-PDU 1 and the correct sub-PDU 5 to an upper layer.

The design solutions of header information of a CB described in the foregoing embodiments are also applicable to the design of header information of a CBG. To avoid repetition, details are not described herein again.

The foregoing describes in detail the data sending method and the data receiving method provided in this application. The following describes a communication apparatus provided in this application.

FIG. 20 is a block diagram of a communication apparatus according to this application. As shown in FIG. 20, the communication apparatus 1000 includes a processing unit 1100, a receiving unit 1200, and a sending unit 1300.

The receiving unit 1200 is configured to obtain a position mapping relationship between N sub-PDUs included in a MAC PDU and data parts of a plurality of CBs, where the plurality of CBs are obtained by dividing a TB, and each of the plurality of CBs obtained by dividing the TB includes header information and a data parts.

The processing unit 1100 is configured to generate a data segment based on the position mapping relationship and the MAC PDU, where the data segment includes the header information and the data parts of the plurality of CBs, the data segment includes a plurality of sub-data segments, a quantity of the sub-data segments is equal to a quantity of CBs obtained by dividing the TB, each sub-data segment corresponds to one of the plurality of CBs obtained by dividing the TB, each sub-data segment includes a first part and a second part, the first part is header information of a CB corresponding to the sub-data segment, the second part is a data part of the CB corresponding to the sub-data segment, the second part includes a part or all of one or more of the N sub-PDUs, and a sum of lengths of respective second parts of the plurality of sub-data segments is equal to a length of the MAC PDU.

The sending unit 1300 is configured to send the TB, where the TB carries the data segment.

The plurality of CBs include a first CB, header information of the first CB indicates a position correspondence between a data part in the first CB and M sub-PDUs in the N sub-PDUs, both N and M are integers, N≥1, M≥1, and M is less than or equal to N.

In an embodiment, the processing unit 1100 is configured to:

obtain information about the MAC PDU, where the information about the MAC PDU includes a quantity of sub-PDUs included in the MAC PDU and a size of each sub-PDU;

obtain information about the TB, where the information about the TB includes a size of the TB, a quantity of CBs obtained by dividing the TB, and a size of each CB, and the size of each CB includes a length of the header information and a length of the data part; and determine the position mapping relationship based on the information about the MAC PDU and the information about the TB.

In another embodiment, one of the N sub-PDUs corresponds to a part or all of one or more network coding NC data packets.

In another embodiment, the plurality of CBs are obtained by dividing the TB plus a CRC code, and the sending unit 1300 is further configured to send the TB to a physical layer through a MAC layer.

The processing unit 1100 is further configured to add a CRC code to the end of the TB by using the physical layer.

The sending unit 1300 is further configured to send the TB and the CRC code through the physical layer.

In some other embodiments, the receiving unit 1200 is configured to obtain a position mapping relationship between N sub-PDUs included in a MAC PDU carried by a first TB and data parts of a plurality of CBs, where the plurality of CBs are obtained by dividing a second TB, and each of the plurality of CBs includes header information and a data part.

The processing unit 1100 is configured to generate the second TB based on the position mapping relationship and the first TB.

The sending unit 1300 is configured to send the second TB.

The plurality of CBs include a first CB, header information of the first CB indicates a position of a data part of the first CB in the MAC PDU, or the header information of the first CB indicates a position correspondence between the data part of the first CB and M sub-PDUs in the N sub-PDUs, both N and M are integers, N≥1, M≥1, and M is less than or equal to N.

In another embodiment, the processing unit 1100 is configured to:

obtain information about the MAC PDU, where the information about the MAC PDU includes a quantity of sub-PDUs included in the MAC PDU and a size of each sub-PDU;

obtain information about the second TB, where the information about the second TB includes a size of the second TB, a quantity of CBs obtained by dividing the second TB, and a size of each CB, and the size of each CB includes a length of the header information and a length of the data part; and determine the position mapping relationship based on the information about the MAC PDU and the information about the second TB.

In another embodiment, the receiving unit 1200 is configured to receive the MAC PDU from the MAC layer through the physical layer, where the MAC PDU includes the N sub-PDUs, and each sub-PDU includes one MAC sub-header.

The processing unit 1100 is configured to parse the MAC sub-headers of the N sub-PDUs by using the physical layer to obtain length information of the N sub-PDUs.

Alternatively, the receiving unit 1200 is configured to receive indication information from the MAC layer through the physical layer, where the indication information indicates information about the MAC PDU.

In the foregoing embodiments, the receiving unit 1200 and the sending unit 1300 may also be integrated into one transceiver unit, and have both of a receiving function and a sending function. This is not limited herein.

In addition, in the embodiments, the processing unit 1100 is configured to perform processing and/or operations implemented inside the transmitting end except sending and receiving actions. The receiving unit 1200 is configured to perform a receiving action, and the sending unit 1300 is configured to perform a sending action.

For example, in FIG. 2, the processing unit 1100 is configured to perform operation 220 and operation 240; the receiving unit 1200 is configured to perform operation 210; and the sending unit 1300 is configured to perform operation 230 and operation 250.

For example, in FIG. 4, the processing unit 1100 is configured to perform operation 320 and operation 330; the sending unit 1300 is configured to perform operation 340; and the receiving unit 1200 is configured to perform operation 310.

Figure 21:
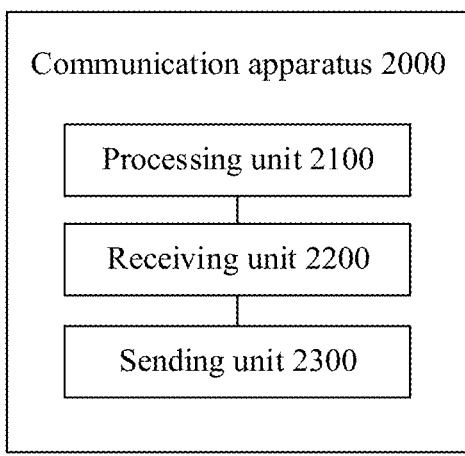
FIG. 21 is a block diagram of another communication apparatus according to this application.

FIG. 21 is a block diagram of another communication apparatus according to this application. As shown in FIG. 21, the communication apparatus 2000 includes a processing unit 2100, a receiving unit 2200, and a sending unit 2300.

The receiving unit 2200 is configured to receive a TB from a transmitting end, where there is a position mapping relationship between data parts in a plurality of CBs obtained by dividing the TB and N sub-PDUs included in a MAC PDU, N≥1, and N is an integer.

The plurality of CBs include a first CB, header information of the first CB indicates a position correspondence between a data part in the first CB and M sub-PDUs in the N sub-PDUs, M≥1, M is an integer, and M is less than or equal to N.

The processing unit 2100 is configured to obtain one or more complete sub-PDUs of the MAC PDU based on the position mapping relationship.

In another embodiment, the processing unit 2100 is further configured to:

perform CRC on the TB; and determine that the CRC on the TB fails.

In another embodiment, the processing unit 2100 is configured to:

perform CRC on the plurality of CBs to obtain a correct CB in the plurality of CBs;

parse header information of the correct CB to obtain a local position mapping relationship between the correct CB and a sub-PDU that has a position correspondence with a data part of the correct CB; and obtain a complete sub-PDU in the correct CB based on the local position mapping relationship.

In another embodiment, the correct CB includes the first CB, the first CB includes a part of a first sub-PDU, a remaining part of the first sub-PDU and a second CB after the first CB have a position correspondence, the second CB is an incorrect CB, and the part of the first sub-PDU includes a start position of the first sub-PDU and a complete sub-header of the first sub-PDU.

The processing unit 2100 is configured to:

parse the header information of the first CB to obtain the sub-header of the first sub-PDU and a position mapping relationship of the first sub-PDU, where the sub-header of the first sub-PDU includes length information of the first sub-PDU;

read the complete first sub-PDU based on the position mapping relationship and the length information, and perform CRC on the complete first sub-PDU; and obtain the complete first sub-PDU if the CRC on the complete first sub-PDU succeeds.

In the foregoing apparatus embodiments, in an embodiment, the data part of the first CB includes start positions of Q sub-PDUs in the M sub-PDUs, the header information of the first CB indicates a position, in the data part of the first CB, of a start position of a sub-PDU that is in the Q sub-PDUs and whose start position is closest to a start position of the first CB, 1≤Q≤M, and Q is an integer.

Alternatively, the data part of the first CB does not include a start position of any sub-PDU, and the header information of the first CB indicates that the first CB does not include a start position of a sub-PDU.

In the foregoing apparatus embodiments, in an embodiment, the header information of the first CB includes a flag field and an offset field, the flag field has a first value and a second value, the first value indicates that the first CB includes a start position of a sub-PDU, and the second value indicates that the first CB does not include a start position of a sub-PDU. When the flag field is the first value, the offset field included in the header information of the first CB indicates an offset, relative to a start position of the data part of the first CB, of a start position of a sub-PDU that is in the sub-PDUs whose start positions fall within the first CB and that is closest to the start position of the first CB.

When the flag field is the second value, the offset field included in the header information of the first CB is an invalid field. The invalid field may not be parsed by the receiving end. The offset field may alternatively be an invalid value.

In the foregoing apparatus embodiments, in an embodiment, the header information of the first CB includes an offset field, and the offset field has a valid value and an invalid value.

When the offset field is the valid value, the valid value indicates that the first CB includes a start position of a sub-PDU, and the valid value indicates an offset, relative to a start position of the data part of the first CB, of a start position of a sub-PDU that is in the sub-PDUs whose start positions fall within the first CB and that is closest to the start position of the first CB.

When the offset field is the invalid value, the invalid value indicates that the first CB does not include a start position of a sub-PDU, and the invalid value indicates an invalid offset.

In the foregoing apparatus embodiments, in an embodiment, the header information of the first CB includes an end position field and a length field, the end position field indicates a position of an end position of the data part in the first CB in a corresponding sub-PDU, and the length field indicates a length of the sub-PDU in which the end position of the data part in the first CB is located.

In the foregoing apparatus embodiments, in an embodiment, the header information of the first CB includes a start position field and a length field, the start position field indicates a position of a start position of the data part in the first CB in a corresponding sub-PDU, and the length field indicates a length of the sub-PDU in which the start position of the data part in the first CB is located.

In the foregoing embodiments, the receiving unit 2200 and the sending unit 2300 may also be integrated into one transceiver unit, and have both of a receiving function and a sending function. This is not limited herein.

In addition, in the embodiments, the processing unit 2100 is configured to perform processing and/or operations implemented internally by the receiving end except sending and receiving actions. The receiving unit 2200 is configured to perform a receiving action, and the sending unit 2300 is configured to perform a sending action.

For example, in FIG. 11, the receiving unit 2200 is configured to perform operation 410, and the processing unit 2100 is configured to perform operation 420.

For example, in FIG. 12, the receiving unit 2200 is configured to perform operation 501, and the processing unit 2100 is configured to perform operation 502 and operations 504 to 506. The sending unit 2300 is configured to perform operation 503 and operation 507.

Figure 22:
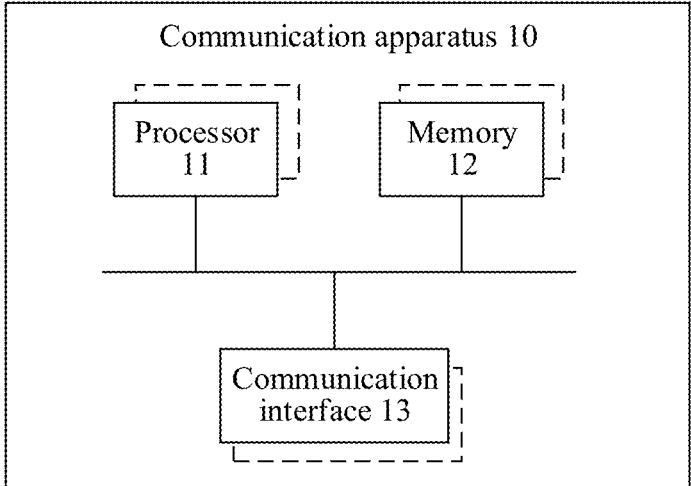
FIG. 22 is a diagram of a structure of a communication apparatus according to this application.

FIG. 22 is a diagram of a structure of a communication apparatus according to this application. As shown in FIG. 22, the communication apparatus 10 includes one or more processors 11, one or more memories 12, and one or more communication interfaces 13. The processor 11 is configured to control the communication interface 13 to receive and send signals. The memory 12 is configured to store a computer program. The processor 11 is configured to invoke the computer program from the memory 12 and run the computer program, so that the communication apparatus 10 performs processing and/or operations performed by the transmitting end in the method embodiments of this application.

For example, the processor 11 may have a function of the processing unit 1100 shown in FIG. 20, and the communication interface 13 may have functions of the receiving unit 1200 and/or the sending unit 1300 shown in FIG. 20. Specifically, the processor 11 may be configured to perform processing or an operation performed inside the transmitting end in FIG. 2 or FIG. 4, and the communication interface 13 is configured to perform sending and/or receiving actions performed by the transmitting end in FIG. 2 or FIG. 4.

In an embodiment, the communication apparatus 10 may be the transmitting end in the method embodiment. In this embodiment, the communication interface 13 may be a transceiver. The transceiver may include a receiver and/or a transmitter. In some embodiments, the processor 11 may be a baseband apparatus, and the communication interface 13 may be a radio frequency apparatus.

In another embodiment, the communication apparatus 10 may be a chip (or a chip system) installed at a transmitting end. In this embodiment, the communication interface 13 may be an interface circuit or an input/output interface.

Figure 23:
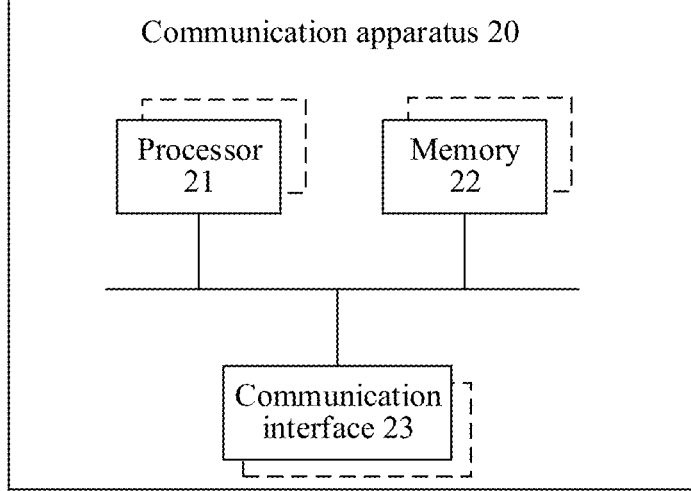
FIG. 23 is a diagram of a structure of another communication apparatus according to this application.

FIG. 23 is a diagram of a structure of another communication apparatus according to this application. As shown in FIG. 23, the communication apparatus 20 includes one or more processors 21, one or more memories 22, and one or more communication interfaces 23. The processor 21 is configured to control the communication interface 23 to receive and send signals. The memory 22 is configured to store a computer program. The processor 21 is configured to invoke the computer program from the memory 22 and run the computer program, so that the communication apparatus 20 performs processing and/or operations performed by the receiving end in the method embodiments of this application.

For example, the processor 21 may have a function of the processing unit 2100 shown in FIG. 21, and the communication interface 23 may have functions of the receiving unit 2200 and/or the sending unit 2300 shown in FIG. 21. Specifically, the processor 21 may be configured to perform processing or an operation performed inside the receiving end in FIG. 12 or FIG. 13, and the communication interface 33 is configured to perform sending and/or receiving actions performed by the receiving end in FIG. 12 or FIG. 13.

In an embodiment, the communication apparatus 20 may be a receiving end in the method embodiment. In this embodiment, the communication interface 23 may be a transceiver. The transceiver may include a receiver and/or a transmitter. In some embodiments, the processor 21 may be a baseband apparatus, and the communication interface 23 may be a radio frequency apparatus. In another embodiment, the communication apparatus 20 may be a chip (or a chip system) installed at a receiving end. In this embodiment, the communication interface 23 may be an interface circuit or an input/output interface.

In FIG. 22 and FIG. 23, a dashed box behind a component (for example, a processor, a memory, or a communication interface) indicates that there may be more than one component.

In some embodiments, the memory and the processor in the foregoing apparatus embodiments may be physically independent units, or the memory may be integrated into the processor. This is not limited in this specification.

In addition, this application further provides a computer-readable storage medium. The computer-readable storage medium stores computer instructions. When the computer instructions are run on a computer, the operations and/or processing performed by the transmitting end in the method embodiments of this application can be performed.

This application further provides a computer-readable storage medium. The computer-readable storage medium stores computer instructions. When the computer instructions are run on a computer, the operations and/or processing performed by the receiving end in the method embodiments of this application can be performed.

In addition, this application further provides a computer program product. The computer program product includes computer program code or instructions. When the computer program code or the instructions run on a computer, the operations and/or processing performed by the transmitting end in the method embodiments of this application can be performed.

This application further provides a computer program product. The computer program product includes computer program code or instructions. When the computer program code or the instructions run on a computer, the operations and/or processing performed by the receiving end in the method embodiments of this application can be performed.

In addition, this application further provides a chip. The chip includes a processor. A memory configured to store a computer program is disposed independent of the chip. The processor is configured to execute the computer program stored in the memory, so that a transmitting end on which the chip is installed performs the operations and/or processing performed by the transmitting end in any method embodiment.

Further, the chip may include a communication interface. The communication interface may be an input/output interface, an interface circuit, or the like. Further, the chip may include the memory.

This application further provides a chip. The chip includes a processor. A memory configured to store a computer program is disposed independent of the chip. The processor is configured to execute the computer program stored in the memory, so that a receiving end on which the chip is installed performs the operations and/or processing performed by the receiving end in any method embodiment.

Further, the chip may include a communication interface. The communication interface may be an input/output interface, an interface circuit, or the like. Further, the chip may include the memory.

In some embodiments, there may be one or more processors, and there may be one or more memories.

In addition, this application further provides a communication apparatus (for example, a chip or a chip system), including a processor and a communication interface. The communication interface is configured to receive (or referred to as input) data and/or information, and transmit the received data and/or information to the processor. The processor processes the data and/or information. The communication interface is further configured to send (or referred to as output) data and/or information processed by the processor, so that the operations and/or processing performed by the transmitting end in any method embodiment can be performed.

This application further provides a communication apparatus (for example, a chip or a chip system), including a processor and a communication interface. The communication interface is configured to receive (or referred to as input) data and/or information, and transmit the received data and/or information to the processor. The processor processes the data and/or information. The communication interface is further configured to output (or referred to as output) data and/or information processed by the processor, so that the operations and/or processing performed by the receiving end in any method embodiment can be performed.

In addition, this application further provides a communication apparatus, including at least one processor, where the at least one processor is coupled to at least one memory, and the at least one processor is configured to execute a computer program or instructions stored in the at least one memory, so that the communication apparatus performs the operations and/or processing performed by the transmitting end in any method embodiment.

This application further provides a communication apparatus, including at least one processor, where the at least one processor is coupled to at least one memory, and the at least one processor is configured to execute a computer program or instructions stored in the at least one memory, so that the communication apparatus performs an operation and/or processing performed by the receiving end in any method embodiment.

In addition, this application further provides a communication device, including a processor and a memory. In some embodiments, the communication device may further include a transceiver. The memory is configured to store a computer program. The processor is configured to invoke and run the computer program stored in the memory, and control the transceiver to receive and send signals, so that the communication device performs an operation and/or processing performed by the transmitting end in any method embodiment.

This application further provides a communication device, including a processor and a memory. In some embodiments, the communication device may further include a transceiver. The memory is configured to store a computer program. The processor is configured to invoke and run the computer program stored in the memory, and control the transceiver to receive and send signals, so that the communication device performs an operation and/or processing performed by the receiving end in any method embodiment.

In addition, this application further provides a wireless communication system, including the transmitting end and the receiving end in the embodiments of this application.

A memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, RAMs in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in this specification includes but is not limited to these and any memory of another proper type.

The methods provided in the foregoing embodiments may be fully or partially implemented by software, hardware, firmware, or any combination thereof. When software is used to implement the embodiments, all or a part of the embodiments may be implemented in a form of a computer program product. The computer program product may include one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by the computer, or a data storage device, for example, a server or a data center, integrating one or more usable media.

To clearly describe the technical solutions in embodiments of this application, words such as "first" and "second" are used in embodiments of this application to distinguish between same items or similar items that have basically a same function or purpose. For example, the first TB and the second TB are merely used to distinguish between different TBs, and a sequence of the first TB and the second TB is not limited. A person skilled in the art may understand that the terms such as "first" and "second" do not limit a quantity or an execution sequence, and the terms such as "first" and "second" do not indicate a definite difference.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent a, b, c, a and b, a and c, b and c, or a, b, and c. a, b, and c each may be singular or plural.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus comprising:
a processor and an interface, wherein the processor is configured to perform operations, including:
obtaining a position mapping relationship between N sub-PDUs comprised in a medium access control protocol data unit (MAC PDU) and data parts of a plurality of code blocks (CBs), wherein the plurality of CBs is obtained by dividing a transport block (TB), and each of the plurality of CBs comprises header information and a data part;

generating a data segment based on the position mapping relationship and the MAC PDU, wherein the data segment comprises a plurality of sub-data segments, a quantity of the sub-data segments is equal to a quantity of CBs obtained by dividing the TB, each sub-data segment corresponds to one of the plurality of CBs obtained by dividing the TB, each sub-data segment comprises a first part and a second part, the first part is header information of a CB corresponding to the sub-data segment, the second part is a data part of the CB corresponding to the sub-data segment, the second part comprises a part or all of one or more of the N sub-PDUs, and a sum of lengths of respective second parts of the plurality of sub-data segments is equal to a length of the MAC PDU; and sending, through the interface, the TB, wherein the TB carries the data segment; wherein the plurality of CBs comprises a first CB, header information of the first CB indicates a position correspondence between a data part in the first CB and M sub-PDUs in the N sub-PDUs, both N and M are integers, $N \geq 1$, $M \geq 1$, and M is less than or equal to N.

2. The apparatus according to claim 1, wherein the processor is configured to obtain a position mapping relationship between N sub-PDUs comprised in a MAC PDU and data parts of a plurality of CBs obtained by dividing a TB by performing operations, including:

obtaining information about the MAC PDU, wherein the information about the MAC PDU comprises a quantity of sub-PDUs comprised in the MAC PDU and a size of each sub-PDU;

obtaining information about the TB, wherein the information about the TB comprises a size of the TB, a quantity of CBs obtained by dividing the TB, and a size of each CB, and the size of each CB comprises a length of the header information and a length of the data part; and determining the position mapping relationship based on the information about the MAC PDU and the information about the TB.

3. The apparatus according to claim 1, wherein one of the one or more N sub-PDUs corresponds to a part or all of one or more network coding (NC) data packets.

4. The apparatus according to claim 1, wherein the data part of the first CB comprises start positions of Q sub-PDUs in the M sub-PDUs, the header information of the first CB indicates a position, in the data part of the first CB, of a start position of a sub-PDU that is in the Q sub-PDUs and whose start position is closest to a start position of the first CB, $1 \leq Q \leq M$, and Q is an integer; or the data part of the first CB does not comprise a start position of any sub-PDU, and the header information of the first CB indicates that the first CB does not comprise a start position of a sub-PDU.

5. The apparatus according to claim 4, wherein the header information of the first CB comprises a flag field and an offset field, the flag field has a first value and a second value, the first value indicates that the first CB comprises a start position of a sub-PDU, and the second value indicates that the first CB does not comprise a start position of a sub-PDU; and when the flag field is the first value, the offset field comprised in the header information of the first CB indicates an offset, relative to a start position of the data part of the first CB, of a start position of a sub-PDU that is in the sub-PDUs whose start positions fall within the first CB and that is closest to the start position of the first CB; or when the flag field is the second value, the offset field comprised in the header information of the first CB is an invalid field.

6. The apparatus according to claim 4, wherein the header information of the first CB comprises an offset field, and the offset field has a valid value and an invalid value; and when the offset field is the valid value, the valid value indicates that the first CB comprises a start position of a sub-PDU, and the valid value indicates an offset, relative to a start position of the data part of the first CB, of a start position of a sub-PDU that is in the sub-PDUs whose start positions fall within the first CB and that is closest to the start position of the first CB; or when the offset field is the invalid value, the invalid value indicates that the first CB does not comprise a start position of a sub-PDU, and the invalid value indicates an invalid offset.

7. The apparatus according to claim 4, wherein the header information of the first CB comprises an end position field and a length field, the end position field indicates a position of an end position of the data part in the first CB in a corresponding sub-PDU, and the length field indicates a length of the sub-PDU in which the end position of the data part in the first CB is located.

8. The apparatus according to claim 7, wherein the end position field indicates a remaining length of the sub-PDU in which the end position of the data part in the first CB is located.

9. The apparatus according to claim 4, wherein the header information of the first CB comprises a start position field and a length field, the start position field indicates a position of a start position of the data part in the first CB in a corresponding sub-PDU, and the length field indicates a length of the sub-PDU in which the start position of the data part in the first CB is located.

10. The apparatus according to claim 9, wherein the start position field indicates a length between the position of the start position of the data part in the first CB in the corresponding sub-PDU and a start position of the sub-PDU.

11. An apparatus, comprising:
a processor and an interface, wherein the processor is configured to perform operations including:
receiving, through the interface, a transport block (TB) from a transmitting end, wherein there is a position mapping relationship between data parts in a plurality of code blocks (CBs) obtained by dividing the TB and N sub-PDUs comprised in a medium access control protocol data unit (MAC PDU), N≥1, and N is an integer; wherein
the plurality of CBs comprises a first CB, header information of the first CB indicates a position of a data part of the first CB in the MAC PDU, or the header information of the first CB indicates a position correspondence between the data part of the first CB and M sub-PDUs in the N sub-PDUs, M≥1, M is an integer, and M is less than or equal to N; and
obtaining one or more complete sub-PDUs of the MAC PDU based on the position mapping relationship.

12. The apparatus according to claim 11, wherein before obtaining the one or more complete sub-PDUs of the MAC PDU based on the position mapping relationship, the processor is further configured to perform operations including:

performing cyclic redundancy check (CRC) on the TB; and determining that the CRC on the TB fails.

13. The apparatus according to claim 11, wherein the processor is configured to obtain one or more complete sub-PDUs of the MAC PDU based on the position mapping relationship by performing operations including:
performing CRC on the plurality of CBs to obtain a correct CB in the plurality of CBs;
parsing header information of the correct CB to obtain a local position mapping relationship between the correct CB and a sub-PDU that has a position correspondence with a data part of the correct CB; and
obtaining a complete sub-PDU in the correct CB based on the local position mapping relationship.

14. The apparatus according to claim 13, wherein the correct CB comprises the first CB, the first CB comprises a part of a first sub-PDU, a remaining part of the first sub-PDU and a second CB after the first CB have a position correspondence, the second CB is an incorrect CB, and the part of the first sub-PDU comprises a start position of the first sub-PDU and a complete sub-header of the first sub-PDU; and
wherein the processor parsing header information of the correct CB to obtain a local position mapping relationship comprises operations including:
parsing the header information of the first CB to obtain the sub-header of the first sub-PDU and a position mapping relationship of the first sub-PDU, wherein the sub-header of the first sub-PDU comprises length information of the first sub-PDU;
reading the complete first sub-PDU based on the position mapping relationship of the first sub-PDU and the length information, and performing CRC on the complete first sub-PDU; and
obtaining the complete first sub-PDU if the CRC on the complete first sub-PDU succeeds.

15. The apparatus according to claim 11, wherein the data part of the first CB comprises start positions of Q sub-PDUs in the M sub-PDUs, the header information of the first CB indicates a position, in the data part of the first CB, of a start position of a sub-PDU that is in the Q sub-PDUs and whose start position is closest to a start position of the first CB, 1≤Q≤M, and Q is an integer; or
wherein the data part of the first CB does not comprise a start position of any sub-PDU, and the header information of the first CB indicates that the first CB does not comprise a start position of a sub-PDU.

16. The apparatus according to claim 15, wherein the header information of the first CB comprises a flag field and an offset field, the flag field has a first value and a second value, the first value indicates that the first CB comprises a start position of a sub-PDU, and the second value indicates that the first CB does not comprise a start position of a sub-PDU; and
when the flag field is the first value, the offset field comprised in the header information of the first CB indicates an offset, relative to a start position of the data part of the first CB, of a start position of a sub-PDU that is in the sub-PDUs whose start positions fall within the first CB and that is closest to the start position of the first CB; or
when the flag field is the second value, the offset field comprised in the header information of the first CB is an invalid field.

17. The apparatus according to claim 15, wherein the header information of the first CB comprises an offset field, and the offset field has a valid value and an invalid value; and when the offset field is the valid value, the valid value indicates that the first CB comprises a start position of a sub-PDU, and the valid value indicates an offset, relative to a start position of the data part of the first CB, of a start position of a sub-PDU that is in the sub-PDUs whose start positions fall within the first CB and that is closest to the start position of the first CB; or when the offset field is the invalid value, the invalid value indicates that the first CB does not comprise a start position of a sub-PDU, and the invalid value indicates an invalid offset.

18. The apparatus according to claim 15, wherein the header information of the first CB comprises an end position field and a length field, the end position field indicates a position of an end position of the data part in the first CB in a corresponding sub-PDU, and the length field indicates a length of the sub-PDU in which the end position of the data part in the first CB is located.

19. The apparatus according to claim 18, wherein the end position field indicates a remaining length of the sub-PDU in which the end position of the data part in the first CB is located.

20. The apparatus according to claim 15, wherein the header information of the first CB comprises a start position field and a length field, the start position field indicates a position of a start position of the data part in the first CB in a corresponding sub-PDU, and the length field indicates a length of the sub-PDU in which the start position of the data part in the first CB is located.

21. The apparatus according to claim 20, wherein the start position field indicates a length between the position of the start position of the data part in the first CB in the corresponding sub-PDU and a start position of the sub-PDU.

\*    \*    \*    \*    \*